US012604819B2

(12) United States Patent
Farrish

(10) Patent No.: US 12,604,819 B2
(45) Date of Patent: Apr. 21, 2026

(54) CHAETOMORPHA REACTOR, WATERFALL ALGAE SCRUBBER, AND BUBBLE UPFLOW ALGAE SCRUBBER METHODS AND DEVICES

(71) Applicant: Bryan Harold Farrish, Santa Monica, CA (US)

(72) Inventor: Bryan Harold Farrish, Santa Monica, CA (US)

( * ) Notice: Subject to any disclaimer, the term of this patent is extended or adjusted under 35 U.S.C. 154(b) by 1294 days.

(21) Appl. No.: 17/169,404

(22) Filed: Feb. 6, 2021

(65) Prior Publication Data

US 2021/0267151 A1     Sep. 2, 2021

Related U.S. Application Data

(60) Provisional application No. 63/130,679, filed on Dec. 26, 2020, provisional application No. 63/053,692, filed on Jul. 19, 2020, provisional application No. 62/983,722, filed on Mar. 1, 2020.

(51) Int. Cl.
| | |
|---|---|
| *A01G 33/00* | (2006.01) |
| *A01K 63/04* | (2006.01) |
| *C02F 3/32* | (2023.01) |
| *C02F 103/20* | (2006.01) |

(52) U.S. Cl.
CPC .............. *A01G 33/00* (2013.01); *C02F 3/322* (2013.01); *A01K 63/045* (2013.01); *C02F 2103/20* (2013.01)

(58) Field of Classification Search
CPC ..... A01G 33/00; C02F 3/322; C02F 2103/20; A01K 63/045; Y02A 40/80; Y02P 60/20
USPC ......................................................... 210/602
See application file for complete search history.

(56) References Cited

U.S. PATENT DOCUMENTS

| | | | | |
|---|---|---|---|---|
| 5,614,097 | A * | 3/1997 | Bender ..................... | C02F 3/10 210/150 |
| 6,128,792 | A * | 10/2000 | Mathews ................ | E04H 4/169 4/490 |
| 9,408,374 | B2 * | 8/2016 | Farrish .................... | A01K 63/04 |
| 9,908,799 | B2 * | 3/2018 | Greenwald ............. | C02F 3/348 |
| 2015/0321932 | A1 * | 11/2015 | Farrish ................... | A01G 33/00 210/489 |

* cited by examiner

*Primary Examiner* — Ekandra S. Miller-Cruz

(57) ABSTRACT

Apparatuses and methods for utilizing different algal growth techniques to filter aquarium water under varying conditions, including freshwater, brackish, and saltwater, and including amounts of nutrients (including ammonia, nitrite, nitrate, phosphate, CO2) which vary from low to high levels. Also disclosed are embodiments to operate above water, submerged, or any combination thereof, in separate or synergistic configurations, as well as embodiments to utilize faster-growing algal species to out-compete and overgrow slower-growing species.

19 Claims, 15 Drawing Sheets

Previous Art

Previous Art

Previous Art

Previous Art

1100

CHAETOMORPHA REACTOR, WATERFALL ALGAE SCRUBBER, AND BUBBLE UPFLOW ALGAE SCRUBBER METHODS AND DEVICES

CROSS-REFERENCE TO RELATED APPLICATIONS

This U.S. utility patent application claims priority to U.S. provisional application 63/130,679 filed Dec. 26, 2020; U.S. provisional application 63/053,692 filed Jul. 19, 2020; and U.S. provisional application 62/983,722 filed Mar. 1, 2020.

FIELD

An embodiment of the invention generally relates to combining or alternating between three modes of operation of growing aquatic plants and macro algae seaweed (not micro algae green water) for the purpose of aquarium filtration: 1) Growing macroalgae or aquatic plants using flowing water; 2) growing macroalgae seaweed using upflowing gas bubbles, and 3) growing macroalgae seaweed using falling water. Another embodiment generally relates to a method of 1) Growing macroalgae or aquatic plant; 2) supplying gas bubbles to the macroalgae or aquatic plant, and 3) harvesting the macroalgae or aquatic plant and any attached growths. Other embodiments are also described.

BACKGROUND

Many industries such as aquaria, aquaculture and wastewater rely on "clean" water for their proper operation. In these industries, "clean" is defined herein as water that is low in nutrients (e.g. Inorganic Nitrate, Inorganic Phosphate, Nitrite, Ammonia, Ammonium, and metals such as Copper). These nutrients cause problems in water such as excessive algae and bacteria growth, and in some cases, poisoning of livestock. In these instances, algae disperse in the water in an uncontrolled manner thereby making removal of the algae difficult.

Algae however, especially "macro" algae seaweed (distinct from "micro" algae green water), can be grown purposefully to remove nutrients from the water. Algae grow faster in moving water, and this is why all devices which purposely grow macro algae seaweed utilize water movement in some way. Macro algae grow even faster in turbulent water, and Walter Adey's U.S. Pat. No. 4,333,263 (incorporated by reference) in the year 1980 describes utilizing turbulent water to grow macro algae to filter an aquarium, while Applicant's U.S. Pat. No. 9,115,008 (incorporated by reference) in the year 2011 describes how to create this turbulent water by utilizing upflowing gas bubbles which rub a rough rigid surface. The challenge remains, however, how to do more filtering in less space, especially for smaller desktop aquariums.

SUMMARY

The sections below (Topics 1, 2, etc) can be read separately with their pertinent claims. The invention herein includes a method of increasing photosynthetic water filtration in a smaller space, comprising the steps of growing macroalgae or a plant; supplying gas bubbles to the macroalgae or plant such that the gas bubbles are directed to travel through and rub strands or leaves of the macroalgae or plant; then harvesting a portion of the macroalgae or plant including any attached growths.

Also described is a convergent and convertible macroalgal cultivation and filtration system comprising a macroalgal containment structure defining a macroalgal containment compartment; a macroalgal attachment structure disposed in the macroalgal containment compartment and defining a macroalgal attachment surface configured to hold solid macroalgal roots and to allow liquids to flow; a water delivery structure attached to the macroalgal containment structure and configured to deliver water into the macroalgal containment compartment; and a gas bubble sparger disposed in the macroalgal containment compartment and configured to deliver gas bubbles into water in the macroalgal containment compartment, wherein rates of delivery of both water and gas bubbles can be varied to convert the system between waterfall scrubber, bubble upflow scrubber, and chaetomorpha reactor configurations.

Also described is an apparatus for growing lengthy macroalgae, comprising a macroalgal attachment structure defining a first macroalgal attachment surface configured to hold solid macroalgal roots and to allow liquids to flow; a first lateral flow guide attached to the first macroalgal attachment surface and defining a pathway which intersects a vertical plane at least two times, the vertical plane passing through the macroalgal attachment surface; whereas lengthy macroalgae which has traveled from the first macroalgal attachment surface is guided laterally so as to be able to grow longer before traveling out of the apparatus.

Also described is another apparatus for growing lengthy macroalgae, comprising a macroalgal attachment structure defining a first macroalgal attachment surface configured to hold solid macroalgal roots and to allow liquids to flow; a first lateral flow guide attached to the first macroalgal attachment surface and defining an origin, endpoint, and pathway, the origin positioned on a vertical line, the pathway traveling away from the vertical line; a second lateral flow guide attached to the first macroalgal attachment surface and defining an origin, endpoint, and pathway; and positioned such that macroalgae can travel from the endpoint of the first lateral flow guide to the origin of the second lateral flow guide, the pathway of the second lateral flow guide traveling nearer to the vertical line, whereas lengthy macroalgae which has grown on and traveled from the first macroalgal attachment surface is guided laterally so as to be able to grow longer before traveling out of the apparatus.

Also described is a non-symmetrical macroalgal attachment structure for variable growing conditions, comprising a macroalgal attachment structure defining a macroalgal attachment surface configured to hold solid macroalgal roots and to allow liquids to flow, the macroalgal attachment structure movable from a first position to a second position; an illumination blocker disposed on the macroalgal attachment surface wherein the illumination blocker allows more point-source illumination to travel to the macroalgal attachment surface when the macroalgal attachment structure is in the first position than the second position.

Also described is an apparatus to increase settled macroalgal growth in a waterfall algae scrubber, comprising a macroalgal attachment structure defining a macroalgal attachment surface configured to hold solid macroalgal roots and to allow liquids to flow; a macroalgal settlement structure defining a macroalgal settlement surface disposed below the macroalgal attachment surface; a gas sparger defining a gas outlet disposed on the macroalgal settlement surface; wherein macroalgae that has traveled from the macroalgal attachment surface to the macroalgal settlement surface and has formed a macroalgal settlement height above the macroalgal settlement surface will be supplied with gas bubbles from the gas outlet, the gas bubbles traveling upwards through the settled macroalgal growth thereby enabling the settled macroalgal growth to accumulate for a longer period of time before dying from lack of nutrients.

Also described is another apparatus to increase settled macroalgal growth in a waterfall algae scrubber, comprising a macroalgal attachment structure defining a macroalgal attachment surface configured to hold solid macroalgal roots and to allow liquids to flow; a macroalgal settlement structure defining a macroalgal settlement surface disposed below the macroalgal attachment surface; an illumination source disposed on the macroalgal settlement surface; wherein macroalgae that has traveled from the macroalgal attachment surface to the macroalgal settlement surface and has formed a macroalgal settlement height above the macroalgal settlement surface will be supplied with illumination from the illumination source, the illumination traveling within the settled macroalgal growth thereby enabling the settled macroalgal growth to accumulate for a longer period of time before dying from lack of illumination.

Lastly described is another apparatus to increase settled macroalgal growth in a waterfall algae scrubber; comprising a macroalgal attachment structure defining a macroalgal attachment surface configured to hold solid macroalgal roots and to allow liquids to flow; a macroalgal settlement structure defining a macroalgal settlement surface disposed below the macroalgal attachment surface; a set of macroalgal gripping structures disposed on the macroalgal settlement surface, wherein macroalgae that has traveled from the macroalgal attachment surface to the macroalgal settlement surface will be secured from falling off the macroalgal settlement surface by the macroalgal gripping structures thereby enabling the settled macroalgae to accumulate for a longer period of time.

DETAILED DESCRIPTION

Several embodiments of the invention with reference to the appended drawings are now explained. Whenever the shapes, relative positions and other aspects of the parts described in the embodiments are not clearly defined, the scope of the invention is not limited only to the parts shown, which are meant merely for the purpose of illustration. Also, while numerous details are set forth, it is understood that some embodiments of the invention may be practiced without these details. In other instances, well-known circuits, structures, and techniques have not been shown in detail so as not to obscure the understanding of this description.

In the process of filtering water using macro algal seaweed filtration ("seaweed" is a general term used herein to also describe macro algae not only in the sea but also in fresh and brackish water), the challenge has been how to grow the macro algae easily so the algae can be removed or harvested, thus removing the nutrients from the water. If the algae are not removed, they will simply die and put nutrients back into the water.

Algae are divided into two main categories: uni-cellular and multi-cellular. Uni-cellular algae are microscopic organisms which drift freely in the water (e.g. plankton) and give the water a usually green tint; they are too small to grab with your fingers. Therefore uni-cellular algae are usually called "micro" algae. Conversely, multi-cellular algae are much larger seaweeds that sometimes, but not always, attach themselves to rigid surfaces such as a rock. Multi-cellular algae can also be "slime", which also attach to rigid surfaces. Since multi-cellular algal seaweeds are much larger than micro algae and can be grabbed with your fingers, they are usually called "macro" algae (slime is also technically a macro algae). Lastly there is cyanobacteria, which is not algae but can also sometimes be grabbed with your fingers. It is these multi-cellular macro algae seaweeds, cyanobacteria, and slime that are the focus of several of the embodiments described herein. And particularly in the descriptions below, care should be taken to observe that the term used is "macro" algae and not "micro" algae, because macro algae is a solid growth that can be grabbed, pulled or scraped, whereas micro algae is a green liquid that can be pumped or poured.

PREVIOUS ART

Figure 1:
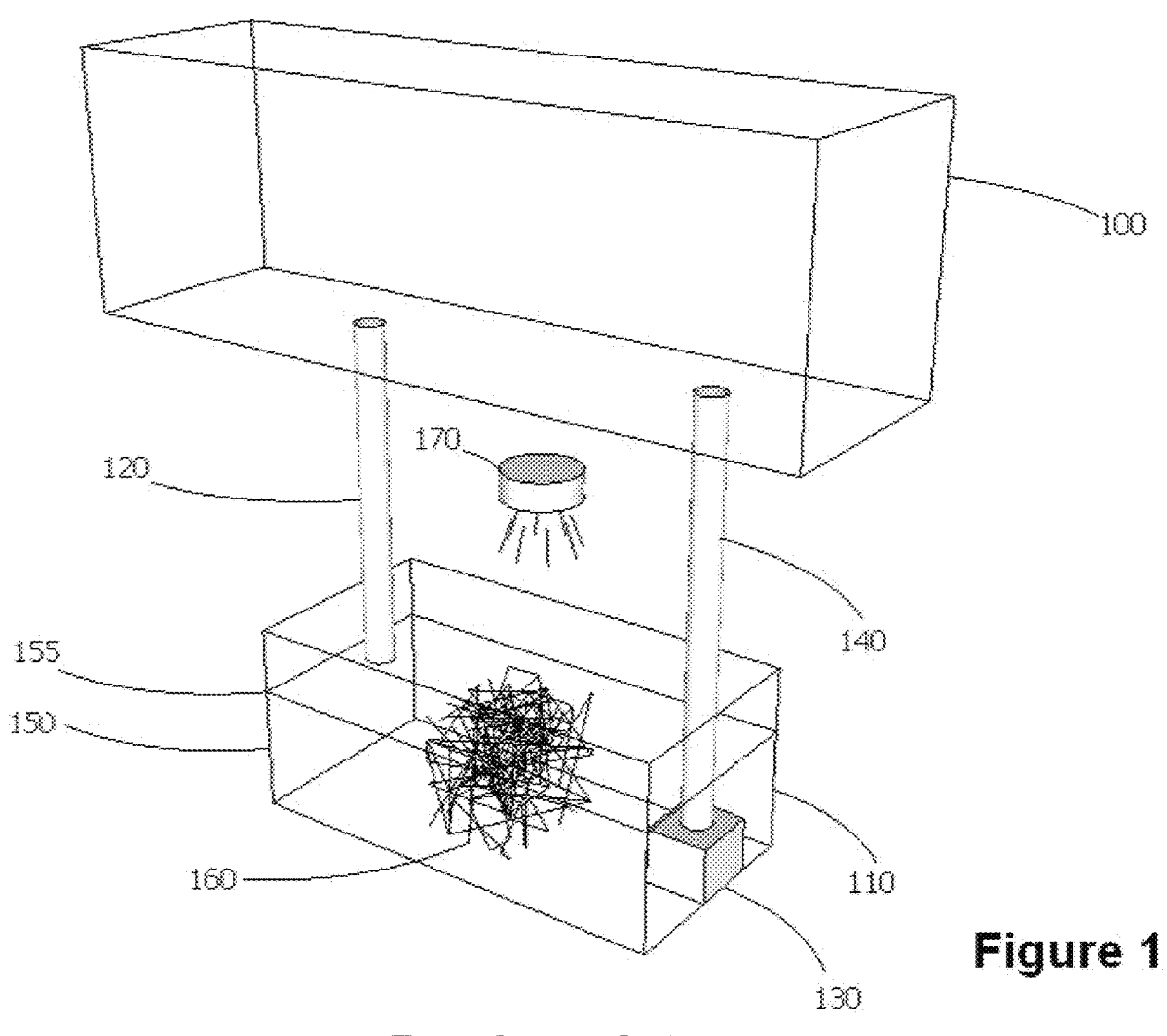
FIG. 1 shows previous art of an upper perspective view of an aquarium above a sump containing chaetomorpha algae and an illumination source.

FIG. 1 shows previous art aquarium 100 and sump 110 in a typical configuration for larger aquariums; sump 110 provides additional space for water and equipment. Water from aquarium 100 is drained down to sump 110 by tubing 120, and then pump 130 sends the water back to aquarium 100 through tubing 140. Sometimes sump compartment 150, with water surface 155 (shown here as just a line) is used to hold a type of macroalgae called Chaetomorpha 160, herein termed "chaeto" and pronounced KAY-tow, with a source of illumination 170 that is placed above to enable photosynthetic growth of chaeto 160 which then grows and absorbs nutrients out of the water. This configuration is easy to set up, however it suffers from weak water flow through chaeto 160 because water will try to flow around clump of chaeto 160 instead of through it. Also, illumination 170 is only on the upper side of chaeto 160, thus creating dark areas that have little growth on the sides, bottom, and especially inside of chaeto 160. These conditions often cause slime algae, cyanobacteria, or other macro algae (not shown) to attach to and cover the surfaces of chaeto 160, further reducing illumination and water flow from reaching chaeto 160; this causes premature die-off of chaeto 160 which then reduces or stops its nutrient absorption.

Figure 2:
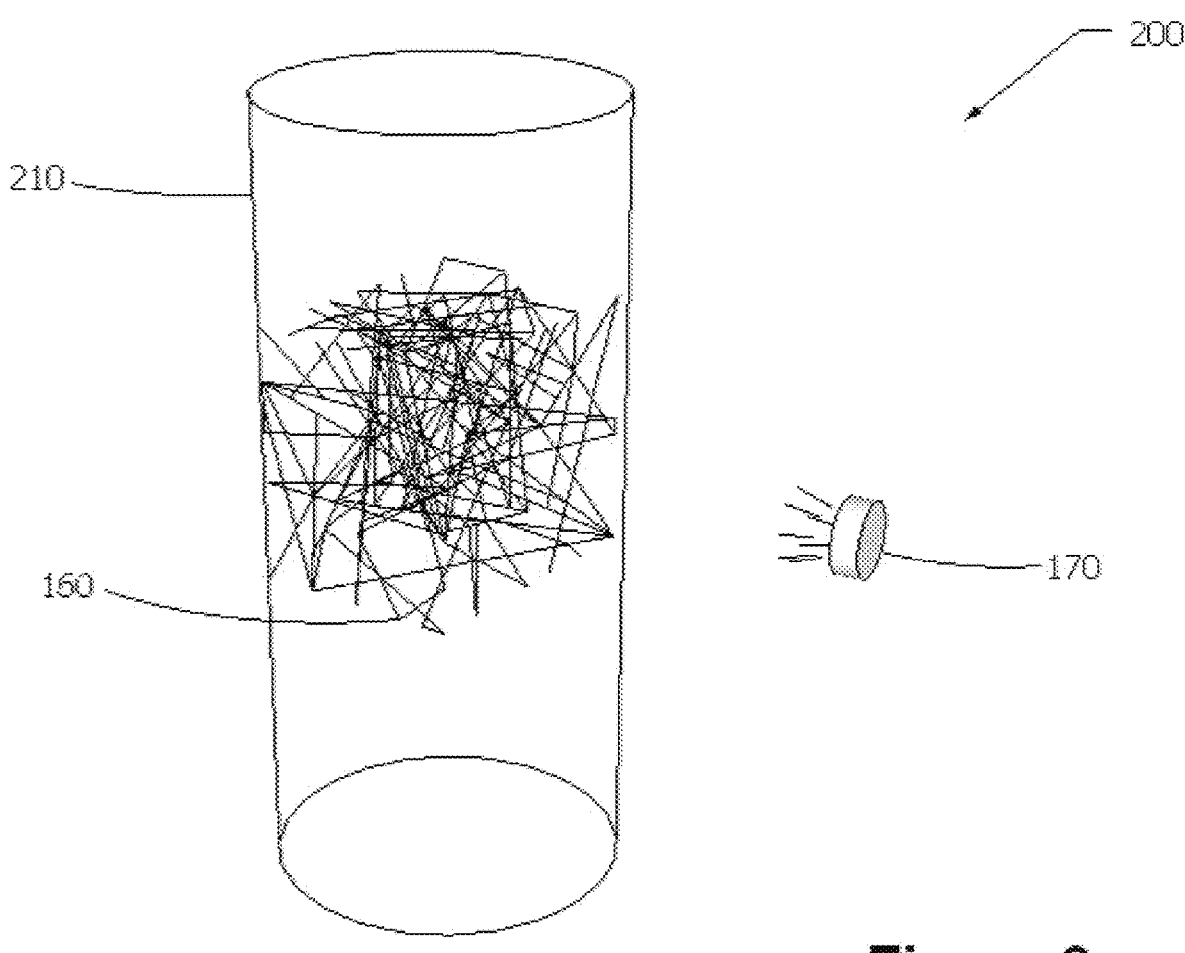
FIG. 2 shows previous art of an upper perspective view of a chaetomorpha algae reactor.

FIG. 2 shows previous art "chaeto reactor" 200 (sometimes called an "algae reactor") which improves growing conditions for chaeto 160 by confining the chaeto to compartment 210 which forces water to flow through instead of around clump of chaeto 160; source of illumination 170 is placed either internal or external to compartment 210, thus minimizing the distance that illumination has to travel to reach inside of chaeto clump 160. While chaeto 160 growing conditions are improved compared to sump compartment 150 in FIG. 1, the amount of growth still becomes limited when slime algae, cyanobacteria, or other macro algae eventually grow on chaeto 160, once again reducing illumination and water from reaching the chaeto.

Figure 3:
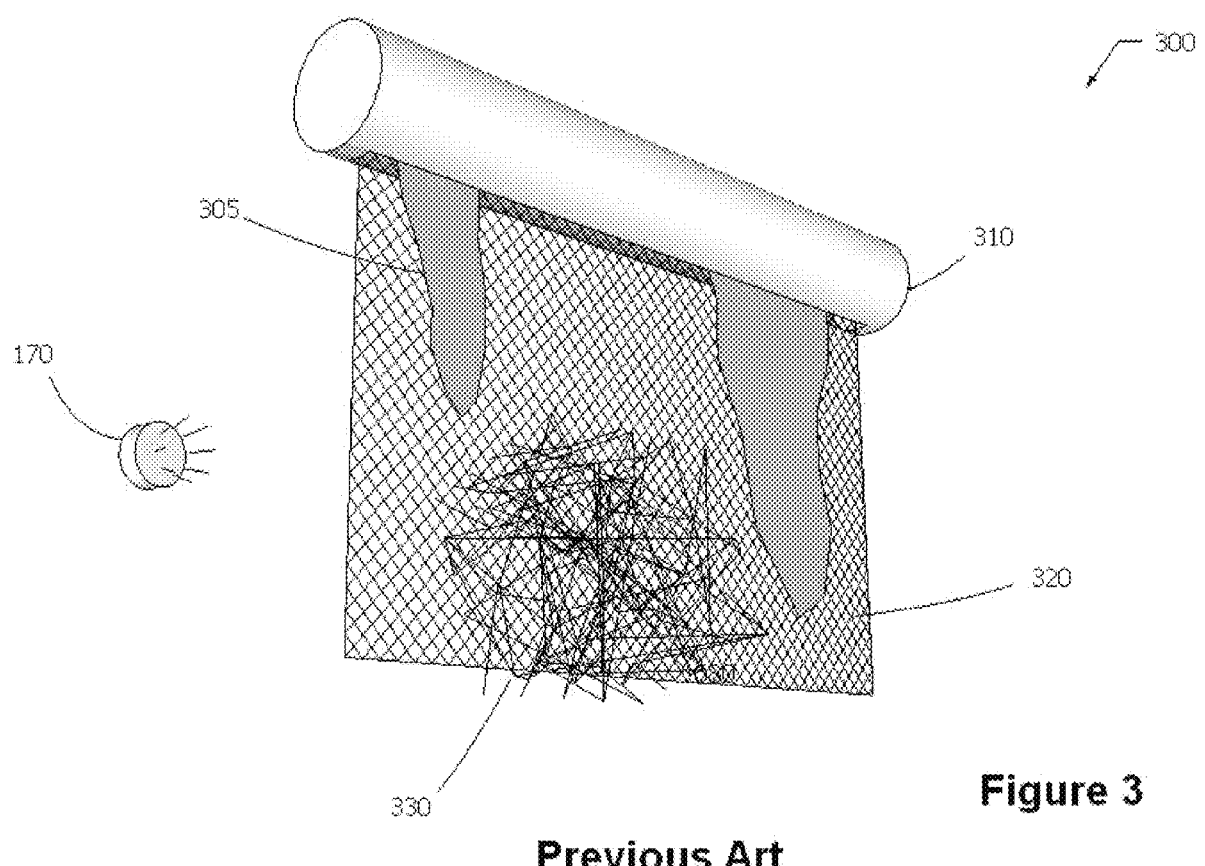
FIG. 3 shows previous art of a lower perspective view of a waterfall algae scrubber invented by Applicant in 2008.

FIG. 3 shows Applicant's invention of waterfall algae scrubber 300 which was donated to the public domain in the year 2008 for others to build with do-it-yourself. (DIY) techniques. Water 305 is shown as a "sheet of water" and flows out of a slot in water pipe 310, then down rough surface 320, and is illuminated by source 170, which causes attached species (usually not chaeto) of macro algae 330 to attach and grow on rough surface 320; this growth 330 then absorbs nutrients out of the water.

Figure 4:
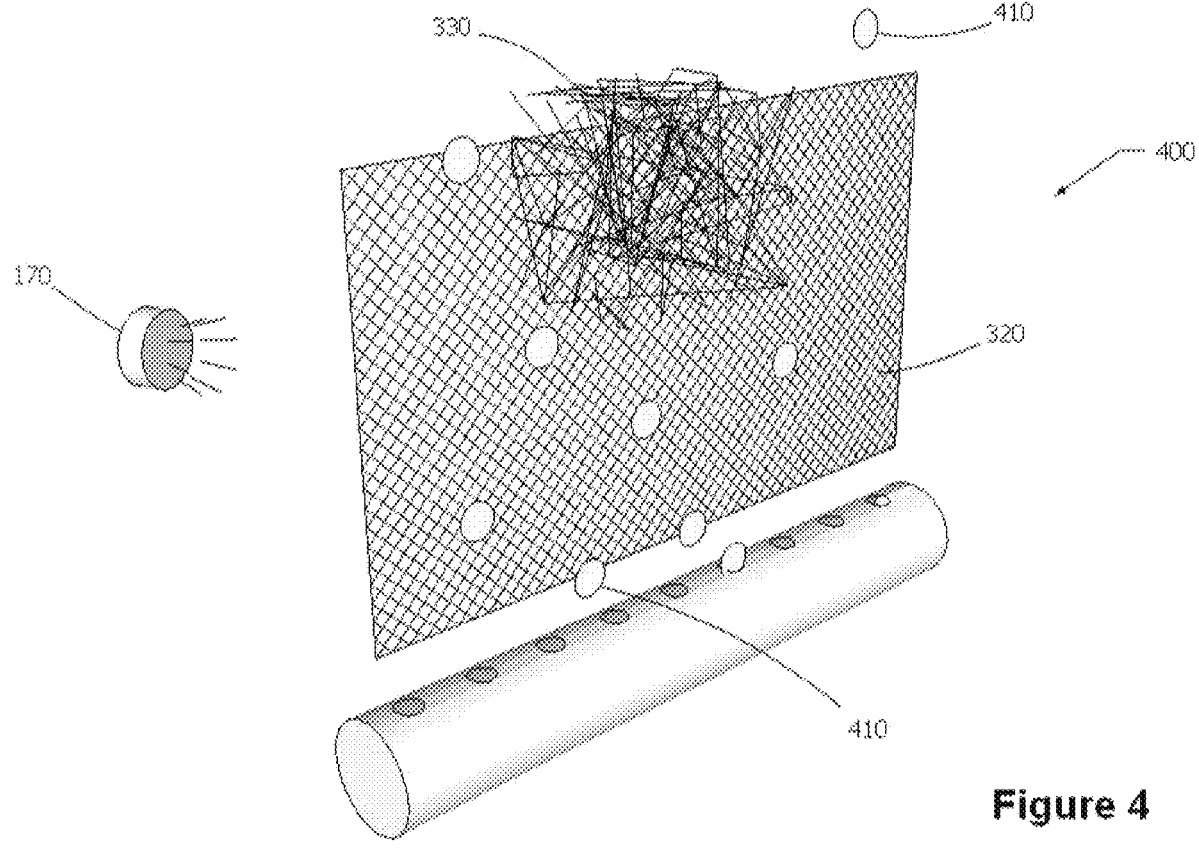
FIG. 4 shows previous art of an upper perspective view of a gas bubble upflow algae scrubber invented by Applicant in 2011.

FIG. 4 shows Applicant's invention of a gas bubble upflow algae scrubber 400 as described in U.S. Pat. No. 9,115,008 in the year 2011. Air bubbles 410 flow up from an air source below (in this case, an air pipe with holes), up rough surface 320, and are illuminated by source 170 which causes an attached species (usually not chaeto) of macroalgae 330 to grow on rough surface 320; this growth then absorbs nutrients out of the water.

The first embodiment of the current invention will now be described in Topic 1 using only the Previous Art figures above, since these same structures are used but in a new method. After this, definitions will be given, and new structures will be described starting in Topic 2.

Topic 1—Enhanced Photosynthetic Water Filtration Using Attached Growths

The reason some photosynthetic growths attach to solid surfaces is because the growths are mostly soft photosynthetic material without any rigid structure, and thus they use other structures to hold on to such as rocks in a stream, which makes the rocks slippery to walk on. Slime algae, and mats of cyanobacteria, along with attached green hair filamentous algae such as Cladophora species, are examples of growths which attach to and cover rigid surfaces (photosynthetic green chlorophyll material is too soft to support itself).

Chaetomorpha macroalgae 160 in FIG. 1, such as Chaetomorpha *Linum* species, is a wire-like saltwater macroalgae similar to very thin angel hair pasta. It has some structure material to keep its shape in flowing water, and some photosynthetic chlorophyll material too, thus it's usually green. It does not however have a high concentration of photosynthetic material because this would make the macroalgae too soft to hold its shape in moving water. Therefore, in "lower" nutrient conditions such as semi-clean aquarium water, chaeto will be out-competed by attached soft growths (not shown) because the attached soft growths are all photosynthetic chlorophyll material which extract the nutrients out of the water faster than the chaeto does. But the attached growths are soft, and thus attach to rigid objects for stability, which ironically can include the chaeto itself. Therefore a typical growth sequence in "high" nutrient aquarium water (e.g., "dirty" water) is that the chaeto grows rapidly for a few weeks until nutrients in the water are lowered, then the chaeto gets covered by attached soft growths which cause the chaeto to turn yellowish and dissolve away, putting the nutrients back into the water. Thus it is difficult to remove large amounts of nutrients using just chaetomorpha macroalgae because the attached soft growths slowly cover up and disrupt the process in a parasitic fashion. Interestingly, this attachment of soft growths can occur with freshwater plants too; many people have had their freshwater aquarium plants covered with "nuisance" algae, which in addition to altering the appearance of the plants, also reduces light and nutrients from reaching the plants. Thus freshwater "planted tank" owners strive to avoid growths which attach to the plants. Nevertheless, the plants still do act as a filter in freshwater.

Applicant showed in U.S. Pat. No. 9,115,008 that upflowing gas bubbles cause macroalgae to quickly attach to rigid surfaces such as a plastic screen, and learned by accident that if the upflowing gas bubbles are placed below a clump of chaeto, then a soft photosynthetic growth will attach to the chaeto immediately. Thus the process of soft growths attaching to and covering the chaeto is accelerated, which would normally not be wanted because it interferes with the growth of the chaeto. But, if you let the chaeto grow first (without attached growths) and then supply gas bubbles to cause attached growths, you obtain more total growth in the same space, and thus the nutrients in the water can be reduced quicker in a smaller space as long as all the growth is removed/harvested before the chaeto starts to die. The amount of time to wait before supplying gas bubbles can vary from several weeks, to a few days, to zero, depending on how fast the chaeto is growing. The same concept applies to a freshwater aquatic plant.

Figure 11:
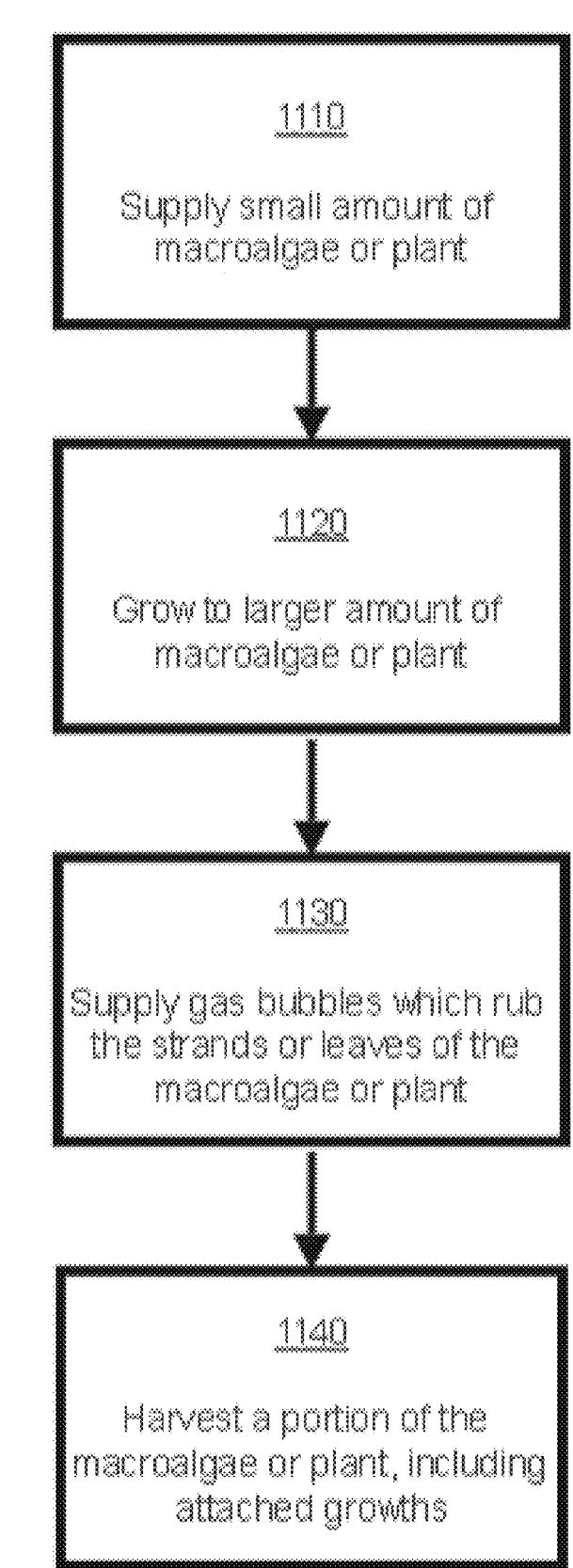
FIG. 11 shows a flowchart diagram of a method embodiment to increase aquatic filtration in a smaller space.

FIG. 11 shows one embodiment method 1100 of the invention herein, which includes the steps of beginning with a first amount (such as a small handful) of macroalgae or plant 1110; growing it to a larger amount of macroalgae or plant 1120; and supplying gas bubbles (usually air or CO2) beneath this larger amount of macroalgae or plant 1130 such that gas bubbles rise up within and rub the individual strands or leaves of the larger amount of macroalgae or plant, causing attached soft growths to grow on the individual strands or leaves. It should be noted that the gas bubbles must physically rub the strands or leaves of macroalgae or plant, as shown in U.S. Pat. No. 9,115,008 FIG. 7, and not merely be near them or on the other side of a wall from them. A portion of the macroalgae or plant, with attached soft growths, is harvested out of the water 1140 so as to remove nutrients from the water. Since both macroalgae or plant, and attached growths, are grown in the same physical space, and harvested at the same time, filtration is accomplished in a single space without needed two separate spaces. And if harvesting only a portion of the macroalgae or plant, a remaining "fresh" portion without attached growths can be available to restart the process at 1110. The macroalgae can be chaetomorpha species, in particular Chaetomorpha *Linum* species. The plant can be any aquatic plant that can be grown submerged, such as java moss, amazon sword, and java fern.

The initial smaller amount of macroalgae or plant can be supplied by the user, or it could be the remainder after the user harvests less than the entire amount. The rate of flow (in liters per minute of gas) of the upflowing gas bubbles can be varied, so as to cause more or less attached growths, therefore increasing or decreasing the number of days before the next harvest is needed; 1.0 liters per minute (lpm) of gas is a common amount for a cross section of macroalgae or plant of 100 square centimeters that the gas bubbles travel through. Other values might be 0.1, 0.5, 2.0, 3.0, 5.0 and 10.0 lpm. A control mechanism could be utilized to provide this rate of gas flow variation. This control mechanism could also start and stop the flow of gas bubbles entirely, including waiting to start to the gas flow until a predetermined amount of time has allowed the macroalgae or plant to grow to a larger amount (because starting the gas bubbles too soon could prevent the macro or plant from growing larger). Also it is feasible to place a gas bubble sparger within (inside) the first amount of macro/plant, such that only the portion of macro/plant above the gas bubble sparger is caused to grow attached growths, whereas the portion of macro/plant below the sparger remains substantially free of attached growths. This will enable the bottom portion of macro/plant to remain in place for the next growing cycle without this portion already being covered with attached growths. The gas bubble sparger could be movable, or retractable into a wall, or removable entirely so as to allow the macro/plant to be harvested easily out of its container. Lastly, a containment compartment 210 could be used as in previous art FIG. 2 to confine upflowing gas bubbles to travel within the macro/plant instead of traveling around the macro/plant.

The waiting period before supplying gas bubbles can be determined by time, as in 1, 2, 3, 4, 5, 6, 7, 8, 9, 10, 11, 12, 13 or 14 days, or 1, 2, 3 or 4 weeks, The period could also be zero days. Alternately the waiting period could be determined by the increase in amount of macro/plant mass, such as 10, 20, 30, 40, 50, 60, 70, 80, 90, 100, 200, 300, 400, 500 or 1000 percent more as measured by visual size or by weighing the macro/plant after removing from the water. The increase in mass could also be zero. The waiting period could also be until attached growths have developed on the macro/plant; in this case the user would wait until the attached growths were seen. The reason for utilizing this technique is that once attached growths begin, the macro/plant usually stops its rapid growth, and thus it's a good time to start gas bubbling to enhance the attached growths.

Topic 1 Example Claims—Enhanced Photosynthetic Water Filtration Using Attached Growths 1. Method of increasing photosynthetic water filtration in a smaller space, comprising the steps of:
   growing macroalgae or plant;
   supplying gas bubbles to the macroalgae or plant such that the gas bubbles are directed to travel through and rub strands or leaves of the macroalgae or plant;
   harvesting a portion of the macroalgae or plant including any attached growths.
2. The macroalgal growing method of claim 1, wherein the step of supplying gas bubbles is done after growths have attached to the macroalgae or plant.
3. The macroalgal growing method of claim 1, wherein the step of growing macroalgae or plant is performed first.

4. The macroalgal growing method of claim 1, wherein the step of growing macroalgae or plant includes starting with a smaller amount of macroalgae or plant and then growing it into a larger amount.
5. The macroalgal growing method of claim 1, wherein the attached growth is slime macroalgae.
6. The macroalgal growing method of claim 1, wherein the attached growth is filamentous macroalgae.
7. The macroalgal growing method of claim 1, further comprising the step of supplying an initial quantity of macroalgae or plant.
8. The macroalgal growing method of claim 1, wherein the rate of liters per minute of gas bubbles is variable.
9. The macroalgal growing method of claim 1, wherein the step of growing utilizes an aquatic plant.
10. The macroalgal growing method of claim 1, wherein the step of growing utilizes chaetomorpha macroalgae.
11. The macroalgal growing method of claim 1, wherein the gas bubbles are supplied substantially beneath the macroalgae or plant;
    thereby enabling the gas bubbles to rise upwards through and rub the individual strands or leaves of the macroalgae or plant.
12. The macroalgal growing method of claim 1, wherein the gas bubbles are supplied substantially inside the macroalgae or plant;
    thereby enabling the gas bubbles to rise upward through and rub an upper portion of the individual strands or leaves of the macroalgae or plant, thereby enabling a bottom portion to be substantially free of attached growths and thus ready for the next growth cycle.
13. The macroalgal growing method of claim 1, further comprising the step of supplying a gas bubble sparger configured to supply gas bubbles to the macroalgae or plant;
    thereby enabling the gas bubbles to rise upward through and rub the individual strands or leaves of the macroalgae or plant.
14. The macroalgal growing method of claim 13, wherein the gas bubble sparger is disposed substantially beneath the macroalgae or plant;
    thereby enabling the gas bubbles to rise upwards through and rub the individual strands or leaves of the macroalgae or plant.
15. The macroalgal growing method of claim 13, wherein the gas bubble sparger is disposed substantially inside the macroalgae or plant;
    thereby enabling the gas bubbles to rise upward through and rub an upper portion of the individual strands or leaves of the macroalgae or plant, thereby enabling a bottom portion to be substantially free of attached growths and thus ready for the next growth cycle.
16. The macroalgal growing method of claim 13, wherein the gas bubble sparger is movable;
    thereby providing an unobstructed pathway for the macroalgae or plant to be harvested.
17. The macroalgal growing method of claim 1, further comprising the step of supplying a containment structure defining a containment compartment configured to direct the upflowing gas bubbles substantially through the macroalgae or plant.
18. The macroalgal growing method of claim 17, further comprising the step of supplying a gas bubble sparger configured to supply the gas bubbles to the macroalgae or plant.

thereby enabling the gas bubbles to rise upward through and rub the individual strands or leaves of the macroalgae or plant.

19. The macroalgal growing method of claim 18, wherein the gas bubble sparger is disposed substantially at the bottom of the containment compartment;

thereby enabling the gas bubbles to rise upward through and rub the individual strands or leaves of the macroalgae or plant.

20. The macroalgal growing method of claim 18, wherein the gas bubble sparger is disposed substantially in the center of the containment compartment;

thereby enabling the gas bubbles to rise upward through and rub an upper portion of the individual strands or leaves of the macroalgae or plant, thereby enabling a bottom portion to be substantially free of attached growths and thus ready for the next growth cycle.

21. The macroalgal growing method of claim 18, wherein the gas bubble sparger is retractable into a wall of the macroalgal containment structure;

thereby allowing an unobstructed pathway for the macroalgae or plant to be removed.

Definitions

Macroalgae: Multi-cellular algal species which often, but not always, attaches to rigid surfaces, and which does not disperse as single cells into water circulation. Example species are Cladophora, Chaetomorpha, and Spirogyra, in which all three of these are all semi-rigid "filamentous" varieties. Macroalgae also includes "slime" species which are soft, and which attach to and grow on rigid surfaces including other macroalgae. Macro algae are distinct from Micro algae, such as *Spirulina* species; micro algae exist primarily as single cells dispersed in a body of water and giving the water a usually green tint. Multi-cellular macroalgal "slime" however will attach to rigid surfaces and grow in thicknesses up to 10 millimeters even though the slime is soft. A notable exception to the multi-cellular definition is Ulva *Lactuca* ("sea lettuce"), which is just a single cell but is semi-rigid and attaches to solid surfaces and can grow in planar sheets larger than 100 millimeter across. It also tastes good.

Slime: A slippery photosynthetic soft growth that develops on submerged rigid surfaces including plants and macroalgae. Slime can be cyanobacteria, diatoms, dinoflagellates, or macroalgal slime of the yellow, brown, green or other color varieties. Slime is soft but not filamentous.

Cyanobacteria: An often purple or red colored photosynthetic soft growth that attaches to rigid surfaces, and can appear as a "dust" that requires brushing to remove, or thick mats which can be scraped and sometimes pulled off of surfaces with your fingers. Cyanobacteria is soft, and often termed "cyano" or "red slime" in the aquarium hobby.

Attached Growths: Any of the above soft growths which attach to and grow on rigid macroalgae or plants.

Water Surface: The horizontal plane of water that touches the air above it. An example is the surface of a lake, or the surface of water in a cup. A sealed bottle that is completely full of water and capped, however, has no water surface because there is no water touching air above it. The water surface "level" is the vertical height of the water surface from the bottom of the water (e.g., the bottom of the lake or cup) up to the water surface.

Nutrients: Inorganic nitrate, inorganic phosphate, nitrite, ammonia, ammonium, and metals such as copper that are present in the water. Nutrients are measured by testing the water with a test kit or measuring device. For saltwater aquariums, "low" nutrient test results are typically below 0.05 ppm (parts per million) of phosphate, and below 1.00 ppm of nitrate; "high" nutrient results are typically above 0.500 ppm of phosphate, and above 20.00 ppm of nitrate. For freshwater aquariums, "low" nutrient test results are typically below 10.00 ppm of nitrate, and "high" nutrient results are typically above 100.00 ppm of nitrate.

Algae Scrubber: Also termed "algae turf scrubber" or "turf scrubber". An apparatus (not to be confused with a scraper or brush) which uses illumination, rough surfaces, and turbulent air/water to purposely grow attached macroalgae on the rough surfaces; the growth of this macroalgae then absorbs or "scrubs" nutrients out of the water. Although algae had been utilized previously to purposely consume nutrients from water, it was Walter Adey's U.S. Pat. No. 4,333,263 in the year 1980 that described how to utilize turbulent air/water to greatly increase the rate of algal growth; the turbulence removed the invisible boundary layer of stagnant water surrounding the algae, and this allowed nutrients to be consumed by the algae faster. The main differences in the types of algae scrubbers since then have focused on how to provide this turbulent air/water, how to provide convenient placement and cleaning, and of course how to build them low in cost.

Waterfall Algae Scrubber: A version of an algae scrubber that generates turbulent air/water by utilizing a cascade of water down a substantially vertical rough surface such as a screen. This version of the algae scrubber was invented by Applicant in 2008 and was dedicated to the public domain, and is one of the most homebuilt DIY (do it yourself) devices made by aquarium hobbyists. It is the opposite of upflow style gas bubble algae scrubbers as described in Applicant's U.S. Pat. No. 9,115,008. For the purposes of the present application, waterfalls can also include any algae scrubber design that utilizes gravity to pull water across a macroalgal attachment surface thus requiring placement of the attachment surface above the water surface level. Such designs might include sloped-river designs, and dumping-bucket designs, although Applicant did not invent these.

Gas Bubble Upflow Scrubber: Also termed "bubble upflow scrubber" or "upflow scrubber" or "upflow algae scrubber". Invented by Applicant in 2011 and described in U.S. Pat. No. 9,115,008 it is the opposite of a waterfall style. It generates turbulent air/water by utilizing upflowing gas bubbles to physically rub a stationary solid surface such as an underwater screen. There is no waterfall because there is nothing above the water surface level.

Chaetomorpha Reactor: Also termed "chaeto reactor" or "macroalgae reactor" or "algae reactor". These reactors do not use turbulent air/water; instead chaetomorpha macroalgae is kept submerged with no gas bubbles used. There are many other "reactors" used for aquariums too; a "reactor" simply is a sealed compartment with a water inlet and water outlet, designed to have no air inside, e.g., no internal water surface level. Reactors are a place for chemical reactions inside them, although in many cases such as with chaetomorpha reactors, it's not really a chemical reaction that is occurring so much as growing of macroalgae. Besides weaker filtering compared to algae scrubbers (reactors need to be five times as large as scrubbers, for the same amount of filtering), a main disadvantage of macroalgae reactors is that the chaetomorpha often get covered ("coated") with other growths such as slime or filamentous (green hair)

algae, and this blocks light and water from reaching the chaetomorpha thus causing the chaeto to dissolve and put nutrients back into the water.

Harvesting: Removing some macroalgae or plant from the apparatus. Also termed "cleaning". When harvesting non-attaching plants or macroalgae (which do not attach to a rigid surface) the user typically reaches into a containment compartment and grabs the growth and pulls it out. When harvesting attached plants, or attached macroalgae such as Cladophora green hair filamentous algae, or Ulva Fasciata ("Easter basket algae"), or any of the slime algae (black, brown, yellow, etc), or thick mats of cyanobacteria, the user typically first removes the attachment structure from the containment compartment, and then scrapes the growth off of the attachment surface.

Containment Compartment: A compartment which substantially retains macroalgae or plants in a stationary position, while allowing water and/or gas bubbles to flow through the compartment. If gas bubbles are used, the containment compartment helps the bubbles travel through the macroalgae or plant instead of around it.

Reservoir: A compartment capable of containing an amount of water, usually with a water outlet that slowly drains water out of the reservoir.

Water Delivery Structure: A structure that supplies water to a macroalgal attachment surface, so that the water can then flow down the macroalgal attachment surface. Examples are a water pipe with a slot or holes, a reservoir that overflows, a reservoir with a slot or holes at the bottom, a pressure spray aimed at the surface, or a combination of these or others. Water must flow to the macroalgal attachment surface, and then flow down the macroalgal attachment surface, in order for the water delivery structure to operate; simply allowing water to flow into a container is not sufficient.

Macroalgal Settlement Structure: A structure defining a macroalgal settlement surface where growths settle after traveling down from a macroalgal attachment surface. The growths may have detached and fallen, or may have just grown long enough to reach the settlement surface.

Up, Upwards, Upper, Above, Top, Down, Downwards, Below, Lower, Bottom, Vertical: These are directions and positions relative to the falling of water. A falling drop of water goes vertically down or downwards, and the opposite direction of this is vertically up or upwards. Something that is lower would have water dripped on it by something which is upper. Something on top would drip water on items below, and, something at the bottom would have water dripped on it by things above it.

Non Vertical: Any direction other than approximately the line that a falling drop of water makes traveling downwards through still air.

Macroalgal Settlement Height: The average thickness of a pile of macroalgae after settling down onto a macroalgal settlement surface. Although wet, this algae is not submerged below a water surface; e.g., gas bubbles cannot travel above the height of the settled algae, although the bubbles can still travel through it.

Lateral Flow Guide: A device similar to a children's slide at a park, which receives macroalgae and then directs this algae laterally in a non-vertical direction, usually at a slope such as 30 degrees downwards for a waterfall, or 30 degrees upwards for a bubble upflow, as measured from horizontal.

Pathway of Lateral Flow Guide: In a waterfall configuration, the downward sloped pathway that water and macroalgae travel along the lateral flow guide, similar to the path that a child would take on a curvy slide, or that a car would take on a curvy road down a hill. In an upflow configuration, it is the upward sloped pathway that gas bubbles and macroalgae travel upwards along the lateral flow guide, similar to an upside-down slide.

Point Source Illumination: A source of illumination smaller than approximately 1 cm in diameter. This might be the size of the lens of an LED (light emitting diode), or a window where illumination travels through. Point source illumination creates strong shadows, and is different from diffused illumination which has a source more than 1 cm which creates weaker or diffused shadows.

Sparger: Device for producing gas bubbles in water. It generally has a gas inlet that connects to a hose, pipe or tubing to receive gas, and often has many smaller gas outlets for the gas to go into water, thus producing bubbles. It can also be the open end of a hose, pipe or tubing; this produces the largest size gas bubbles.

Floor: The bottom portion of a structure (such as a reservoir) where water will collect due to gravity.

Floor Water Outlet: A port, such as a slot or hole in a floor, where water can drain away from the floor.

Overflow Re-Router: Apparatus which accepts macroalgae which has escaped the pathway of a lateral flow guide, then redirects this macroalgae back onto the next lateral flow guide vertically from it; this next guide is below, in the case of a waterfall, or above, in the case of a bubble upflow.

Gas/Water Mixture Delivery Structure: Structure which supplies turbulent gas and water to a macroalgal attachment surface. Common examples are a water pipe with a slot or holes; a reservoir with a slot or holes; a gas bubble sparger; and a dumping bucket.

Chaetomorpha Retainer: Substantially rigid protrusions which retain chaetomorpha stationary in moving water. These retainers typically are transverse to the flow of the water, such that a clump of chaetomorpha cannot move beyond the retainer.

Topic 2—Waterfall and Upflow Convergence Scrubber

Waterfall algae scrubber 300 in prior art FIG. 3 was almost always installed in a sump compartment 150 in prior art FIG. 1, and macroalgal attachment surface 320 was usually the surface of a plastic screen above sump water surface 155 so that the water would flow down macroalgal attachment surface 320 and then down to sump water surface 155. Attached macroalgal growth 330 would always grow only on the portion of attachment surface 320 above water surface 155, even if part of attachment surface 320 went below water surface 155 such as when the screen was too long. When the screen was lifted up for cleaning/harvesting, there was always a horizontal line on the screen where water surface 155 was; the growth 330 would be above this line, but not below it, demonstrating how turbulent air/water is needed for maximum attached growth 330, and this air/water condition was only found above water surface 155 where a thin sheet of water was rapidly flowing down screen surface 320. Once the downflowing water reached sump water surface 155 below, there was no more air below that point, thus very little attached growth 330 below that point. Many people tried placing the screen completely beneath the water, but all attached growth 330 would die off, even if the water in compartment 150 had a lot of flowing motion. This makes sense when you think about how green algae (seaweed) can attach to rocks at the beach so as to get very strong air/water turbulence from the crashing waves; the algae thrive in air/water turbulence.

Applicant's invention of the gas bubble upflow algae scrubber 400 in prior art FIG. 4 and described in U.S. Pat. No. 9,115,008 allowed for placement of the macroalgal attachment surface 320 completely below sump water surface 155, such that all the space above sump water surface 155 remained open and allowed the user more space when working beneath aquarium 100. Attached growth 330 would occur where upflowing gas bubbles 410 rubbed attachment surface 320, and of course the growth would stop at water surface 155 and not go higher because the bubbles could not come up out of the water. One day however, an upflow scrubber 400 was unintentionally placed below a waterfall scrubber 300, and the downflowing water from waterfall 300 mixed with the upflowing bubbles from upflow 400 to create a very turbulent convergence zone of growth that surpassed what either scrubber could grow separately. So it was determined that this convergence of turbulence increased (rather than cancelled) total attached macroalgal growth 330 by simply placing a waterfall above an upflow, instead of placing them in separate locations as had previously been done. Indeed, this convergence growth at the sump water surface 155 can be the majority of growth of this configuration.

Figure 5:
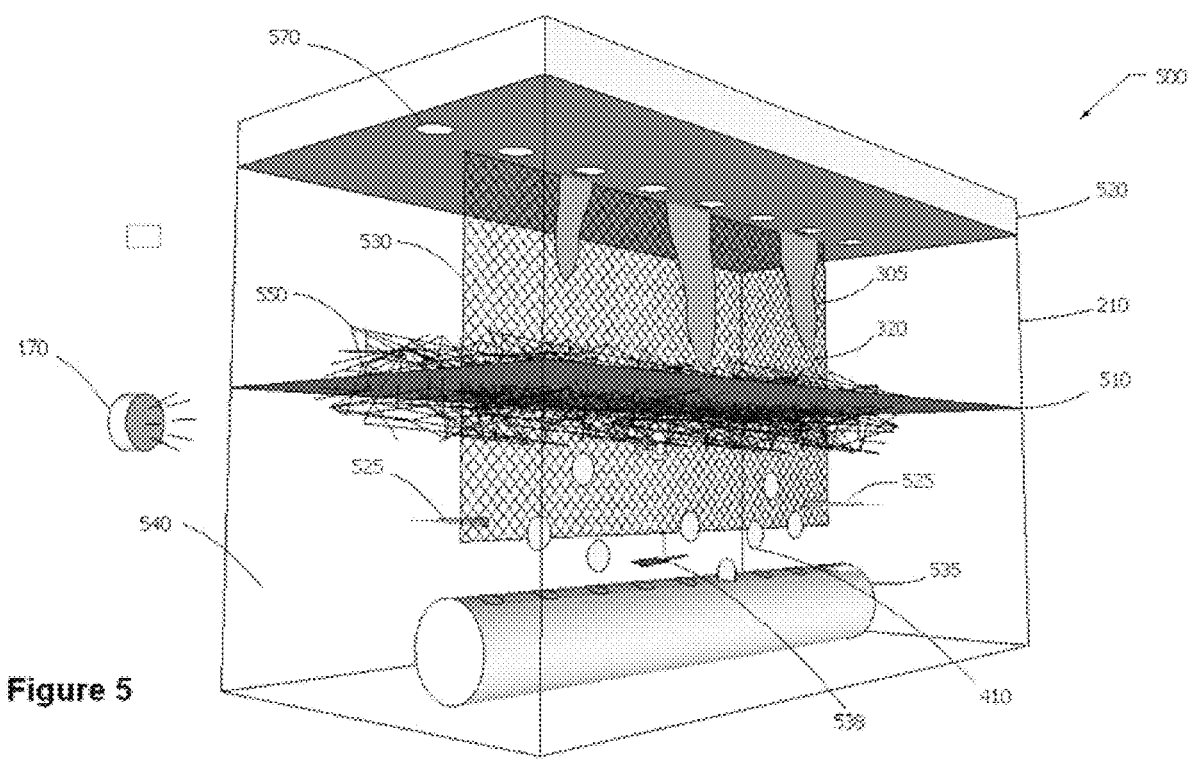
FIG. 5 shows a lower perspective view of an embodiment of the present invention of a convergence scrubber.

FIG. 5 is the first figure herein to disclose an embodiment of the present invention, and shows Applicant's "convergence growth scrubber" 500. Macroalgal containment compartment 210 is shown here with transparent walls, and has internal water surface 510 and sits in a sump compartment similar to 150 of sump 110 in FIG. 1. There is also a drain not shown, to allow water to exit. Internal water surface 510 and sump water surface (155 in FIG. 1) can be at different heights but are often the same. Water delivery structure 520 delivers downward flowing water 305 to macroalgal attachment structure 530 which defines macroalgal attachment surface 320; downflowing water 305 then travels down to internal water surface 510. Gas bubble sparger 535 delivers upflowing gas bubbles 410 into water 540 inside macroalgal containment compartment 210 such that the gas bubbles 410 flow upwards and rub macroalgal attachment surface 320, the bubbles continuing upwards to internal water surface 510 where the bubbles interact with the downflowing water 305 to form a convergent turbulence zone which develops convergent growth 550.

Besides the large amount of convergent growth 550 that can be achieved, scrubber 500 enables internal water surface level 510 to fluxuate up and down without causing loss of filtration. A previous art waterfall scrubber 300 (FIG. 3) by itself reduces filtration if the internal water surface level rises too high because more of the macroalgal attachment surface 320 becomes submerged, thus stopping growth. And previous art upflow scrubber 400 (FIG. 4) reduces filtration if the water level lowers too far, because more of the macroalgal attachment surface 320 comes out of the water and cannot get bubbles. But in a convergent configuration 500, the convergence turbulence zone and convergent growth 550 simply move up and down with changing water level 510. This is important in aquarium sumps because one purpose of the sump is to allow water in an aquarium (100 in FIG. 1) to evaporate without changing the water level in aquarium 100. Instead, aquarium 100 stays full, and the evaporated water causes sump water surface level (155 in FIG. 1) to go down instead. And when new water is added to sump 110, it brings sump water surface level 155 back up, again without changing the level of water in aquarium 100. This changing water surface level 155 in a sump also occurs in smaller desktop aquariums (not shown) where the sump is located on the back of the aquarium instead of below the aquarium.

In addition to operating in varying internal water surface 510 levels, convergence scrubber 500 can be converted to strict waterfall mode by turning off upflowing gas bubbles 410, or can be converted to strict upflow mode by turning off downflowing water 305. Waterfall mode is useful when entire scrubber 500 is to be located above sump water surface 155 and thus there is no water inside scrubber 500 for bubbling. Upflow mode is useful when entire scrubber 500 is to be fully submerged and thus there is no internal room for a waterfall to flow downwards.

Convergence scrubber 500 has another interesting configuration: If you remove macroalgal attachment structure 530 entirely from macroalgal containment compartment 210, you end up with a chaetomorpha reactor 200 in FIG. 2, with water delivery structure 520 and sparger 535 still in position. This ties in with the method of chaeto filtering (using attached growths described above) because that method requires a sparger to supply gas bubbles to the chaeto, thus causing soft attached growths to grow on the chaeto.

Alternate to removal, macroalgal attachment structure 530 could instead be movable, such as by folding it into a wall of macroalgal containment compartment 210. Either by removal or movement, macroalgal attachment structure 530 must make room for chaeto or plant (not shown) to be removed, usually by hand. But macroalgal attachment structure 530 can be modified by adding chaetomorpha retainers 525 which extend transversely to vertical water flow, thus holding chaeto or plant (not shown) in place. And when structure 530 is removed, retainers 525 will pull the chaeto/plant out with it. Retainers 525 are needed for chaeto and some plants because they do not attach to rigid surfaces, and therefore a solid object 525 must be positioned within them.

An interesting application of a movable macroalgal attachment structure 530 is to use it to rotate the chaeto/plant. Chaetomorpha macroalgae, and many plants, because of their cellulose wire-like structure, prevent illumination from source 170 from traveling very far into the chaeto/plant, thus causing the inner parts of the chaeto/plant to die from lack of photosynthesis. Various prior art techniques (not shown) have been attempted to remedy this by rotating chaeto so that different portions of chaeto are nearer to illumination 170 at different times; techniques such as pumping in water into compartment 210 at an angle so as to rotate the chaeto, or using an electric motor, or just reaching in and manually rotating the chaeto. However, Applicant found that utilizing upflowing gas bubbles 410 to rotate macroalgal attachment structure 530 provided the most reliable, continuous, and lowest cost automated technique, and this is done by attaching a "propeller" 538 to macroalgal attachment structure 530, or by modifying structure 530 itself to be a propeller or spiral shape, which will rotate in the upflowing gas bubbles 410 if attachment structure 530 is rotatable (propeller 538 is show very small so as to not clutter the figure).

A water delivery structure 520 is needed to direct water into macroalgal containment compartment 210, but in contrast to prior art chaeto reactor 200 in FIG. 2 which only needs to deliver water anywhere in container 210, water delivery structure 520 needs to also be able to operate in waterfall mode which sends water 305 directly to attachment surface 320. Thus in embodiment 500, water delivery structure 520 defines a reservoir with water outlets 570 that deliver downflowing water 305 directly to macroalgal attachment surface 320. When attachment structure 530 is removed, water outlets 570 then simply deliver downflowing water 305 into containment compartment 210. Water delivery structure 520 could also be a pipe 310 as in prior art FIG. 3, such that when the screen is removed from pipe 310, downflowing water 305 enters compartment 210.

Another embodiment is where water delivery structure 520 is sealed, e.g. the openings such as 570 are not open to the atmosphere, and water is delivered to openings 570 by some other structure such as tubing. If the containment compartment 210 is also sealed, then this variation allows scrubber 500 to be operated outside of a sump without needing to be placed in water, and thus can be utilized beneath an aquarium that has no sump; water instead goes into scrubber 500 and then back to the aquarium via additional tubing not shown. And a last embodiment is where the scrubber 500 can be operated without the macroalgal attachment structure; in this case, only chaeto or a plant is grown in the containment compartment, and gas bubbles are supplied as needed.

Topic 2 Example Claims—Waterfall and Upflow Convergence Scrubber

1. Convergent and convertible macroalgal filtration system, comprising:
   a macroalgal containment structure defining a macroalgal containment compartment;
   a macroalgal attachment structure disposed in the macroalgal containment compartment and defining a macroalgal attachment surface configured to hold solid macroalgal roots and to allow liquids to flow;
   a water delivery structure attached to the macroalgal containment structure and configured to deliver water to the macroalgal attachment surface;
   a gas bubble sparger disposed in the macroalgal containment compartment and configured to deliver gas bubbles into water in the macroalgal containment compartment;
   wherein rates of delivery of both water and gas bubbles can be varied to convert the system between waterfall scrubber, bubble upflow scrubber, and chaetomorpha reactor configurations.
2. The convergent macroalgal system of claim 1, wherein the containment compartment and water delivery structure is sealed from the surrounding atmosphere;
   thereby allowing the system to be utilized without being placed in a body of water.
3. The convergent macroalgal system of claim 1, wherein gas bubbles from the gas bubble sparger are delivered to the macroalgal attachment surface.
4. The convertible macroalgal system of claim 1, wherein the macroalgal attachment structure is removable from the macroalgal containment compartment;
   thereby enabling the entire macroalgal containment compartment to be utilized for chaetomorpha or plant growth, with gas bubbles supplied as needed.
5. The convertible macroalgal system of claim 1, wherein the macroalgal attachment structure can fold against an interior wall of the macroalgal containment compartment;
   thereby enabling harvesting of chaetomorpha or plant without needing to remove the macroalgal attachment structure.
6. The convertible macroalgal system of claim 1, wherein the macroalgal attachment structure is rotatable within the macroalgal containment compartment;

thereby enabling different portions of macroalgal growth within the macroalgal containment compartment to be positioned nearer to or farther from an illumination source.
7. The convertible macroalgal system of claim 6, wherein the macroalgal attachment structure is rotated by upflowing gas bubbles.
8. The convertible macroalgal system of claim 7, wherein the macroalgal attachment structure is spiral shaped so as to rotate due to the force of the upflowing gas bubbles.
9. The convertible macroalgal system of claim 1, wherein the water delivery structure is a pipe.
10. The convertible macroalgal system of claim 1, wherein the water delivery structure is a reservoir.
11. The convertible macroalgal system of claim 10, wherein the reservoir defines a floor and a floor water outlet, the floor water outlet disposed proximal to the top of the macroalgal containment compartment;
    thereby enabling downflowing water to be used for both chaetomorpha reactor and waterfall scrubber operation.
12. The convertible macroalgal system of claim 11, wherein the floor water outlet is a slot.
13. The convertible macroalgal system of claim 1, wherein the gas bubble sparger is disposed proximal to the bottom of the macroalgal containment compartment.
14. The convertible macroalgal system of claim 13, wherein the gas bubble sparger is attached to the macroalgal attachment structure;
    thereby enabling gas bubbles to rub the macroalgal attachment surface when the macroalgal attachment surface is in any location within the macroalgal containment compartment.

Topic 3—Guidance Structures for Lengthy Macroalgae

FIGS. 6A-6F show different embodiments for handling lengthy macroalgae 620, all which include macroalgal attachment structure 530 defining macroalgal attachment surface 320 similar to prior art FIG. 3, but now adding a first lateral flow guide 630 so as to guide lengthy macroalgae 620. Lengthy macroalgae 620 occurs mostly in freshwater, and is dominated by Spirogyra species which can grow to lengths over one meter. Since most aquarium sumps (110 in previous art FIG. 1) have water surface levels 155 of less than a fifth of this length, the lengthy macroalgae 620 causes problems because it gets stuck in pump 130 and other places. But it was then discovered that "folding" lengthy growth 620 in your hands prevented this. And if a structure is used to keep it folded, then additional growth is enabled which increasing filtering. Folding of macroalgae is usually not desired because it causes deep thicker areas which do not receive enough illumination and water, but the present embodiment solves this.

In saltwater, growth 330 of prior art FIG. 3 can be thick like a bush, and therefore it is desired to have a strong downward waterfall which will flow over it. But thin and lengthy growth 620 in freshwater works well in sideways configurations (like a stream) because it does not become "bushy"; instead it's similar to a long string which flows in the stream. This is opposite of traditional micro algae single-cell algal circular ponds or raceways currently used for large scale green water cultivation, because these micro algae raceway ponds have no lengthy macroalgae 620 attached or following a pathway anywhere in them (indeed, attached macro algae is counter-productive in micro algae green water, because it blocks the flow).

Figure 6A:
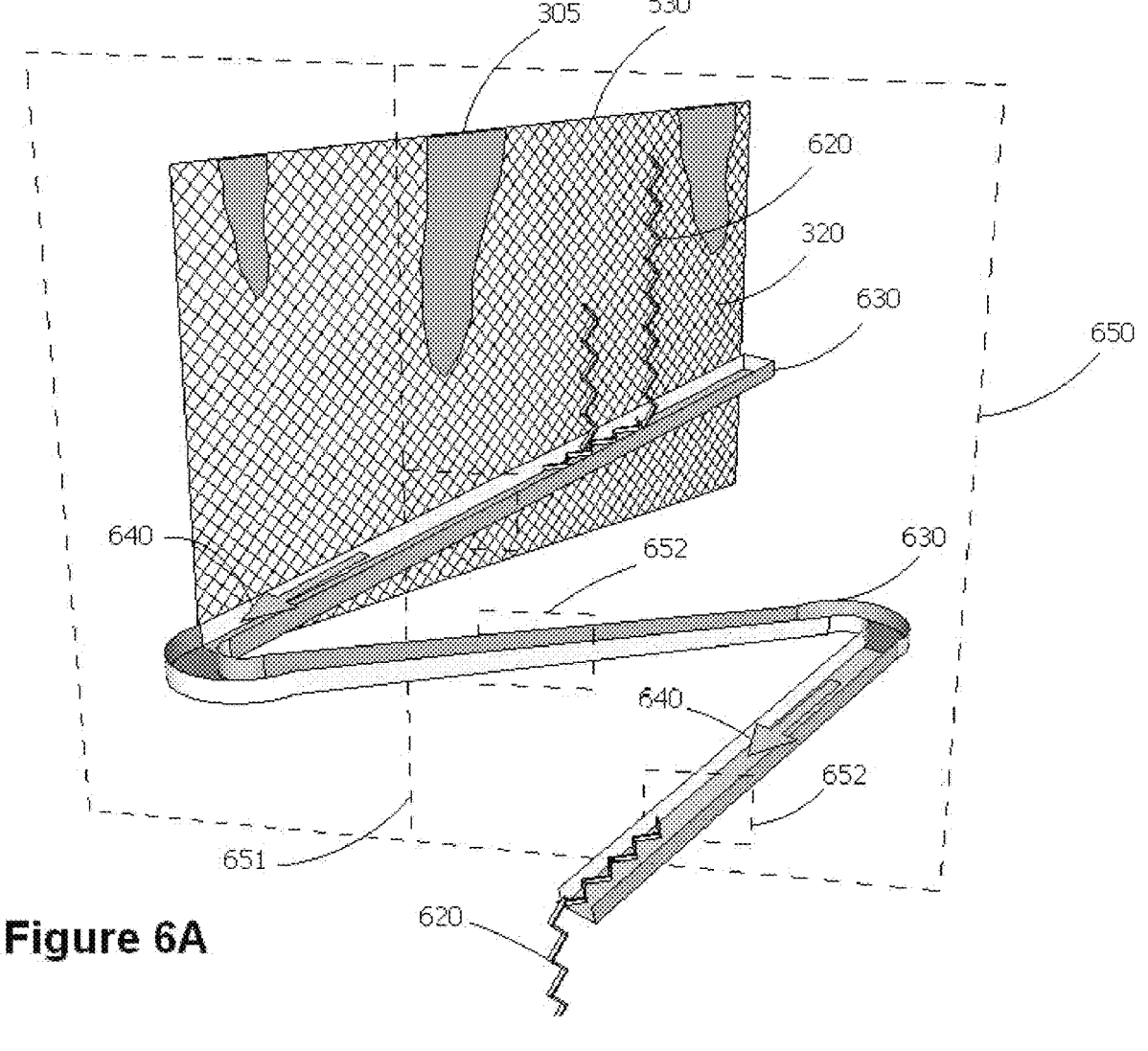
FIG. 6A shows an upper perspective view of an embodiment of a lateral flow guide on a waterfall scrubber.

FIG. 6A is a perspective view looking slightly downwards on an embodiment with first lateral flow guide 630 attached to macroalgal attachment structure 530. Water 305 and attached lengthy macroalgae 620 flow down macroalgal attachment surface 320 to first lateral flow guide 630. Water 305 and algae 620 are then redirected leftwards in this figure along pathway arrow 640. Because lengthy macroalgae 620 in freshwater is almost always much longer than structure 530, the pathway 640 must be folded towards the right and back again to the left (in this figure). It should also be noted that pathway 640 is always flowing at a downwards angle like a slide at a park. To define this folding, imaginary vertical plane 650 is shown intersecting 651 macroalgal attachment surface 320 and also intersecting 652 at different sections of pathway 640. This definition herein requires that pathway 640 cross imaginary plane 650 at least two times (here it occurs three times) and the intersection point 651 can be selected to be any point on surface 320, and the direction of plane 650 can be any direction such that plane 650 passes through surface 320. Thus no matter what direction pathway 640 takes, vertical plane 650 (which is infinite) can be placed and oriented somehow on macroalgal attachment surface 320 and it will intersect pathway 640 at least two times.

Figure 6B:
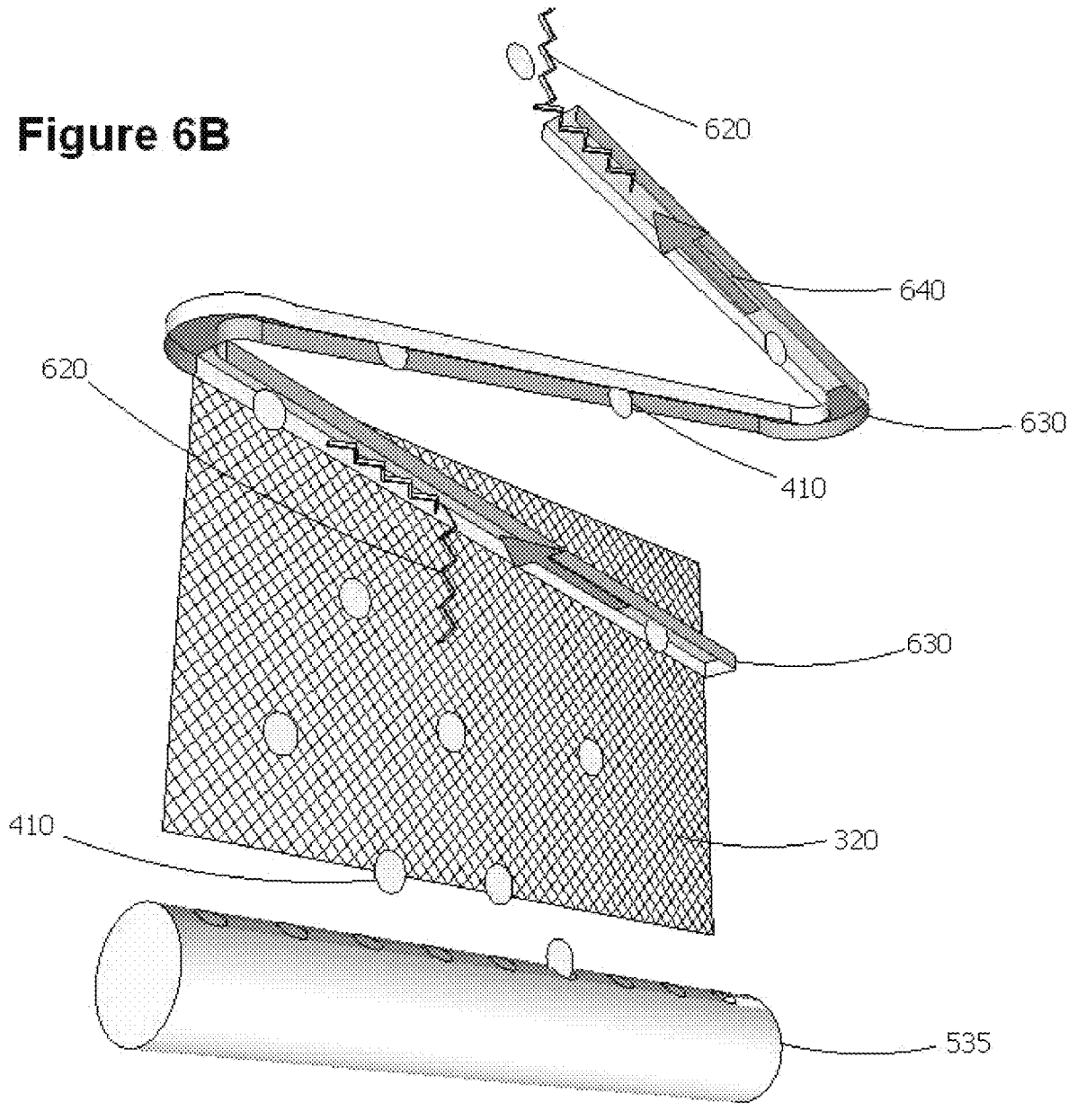
FIG. 6B shows a lower perspective view of an embodiment of a lateral flow guide on an upflow scrubber.

FIG. 6B is a perspective view looking slightly upwards on an embodiment where first lateral flow guide 630 is inverted to be used with upflowing gas bubbles 410. All configurations of lateral flow guide 630 herein can be inverted and utilized with gas bubbles 410 because lengthy macroalgae 620 is long and stringy in freshwater and thus rarely clogs pathway 640. Instead, upflowing gas bubbles 410 follow first lateral flow guide 630 along pathway 640 which would intersect imaginary vertical plane 650 at least two times if the plane were at a certain position (such as the left side of surface 320 in this figure). Gas bubble sparger 535 releases gas bubbles 410 into the water (not shown) below macroalgal attachment surface 320, and the bubbles rise upwards and rub surface 320 causing lengthy macroalgae 620 to attach and grow upwards on surface 320. Gas bubbles 410 and algae 620 continue upwards together until they reach first lateral flow guide 630 where the water and algae travel laterally to the left (in this figure) along the arrow of pathway 640. Pathway 640 is then folded right and then left (in this figure), and is always in an upwards slope so as to enable gas bubbles 410 to continue flowing upwards along pathway 640.

Figure 6C:
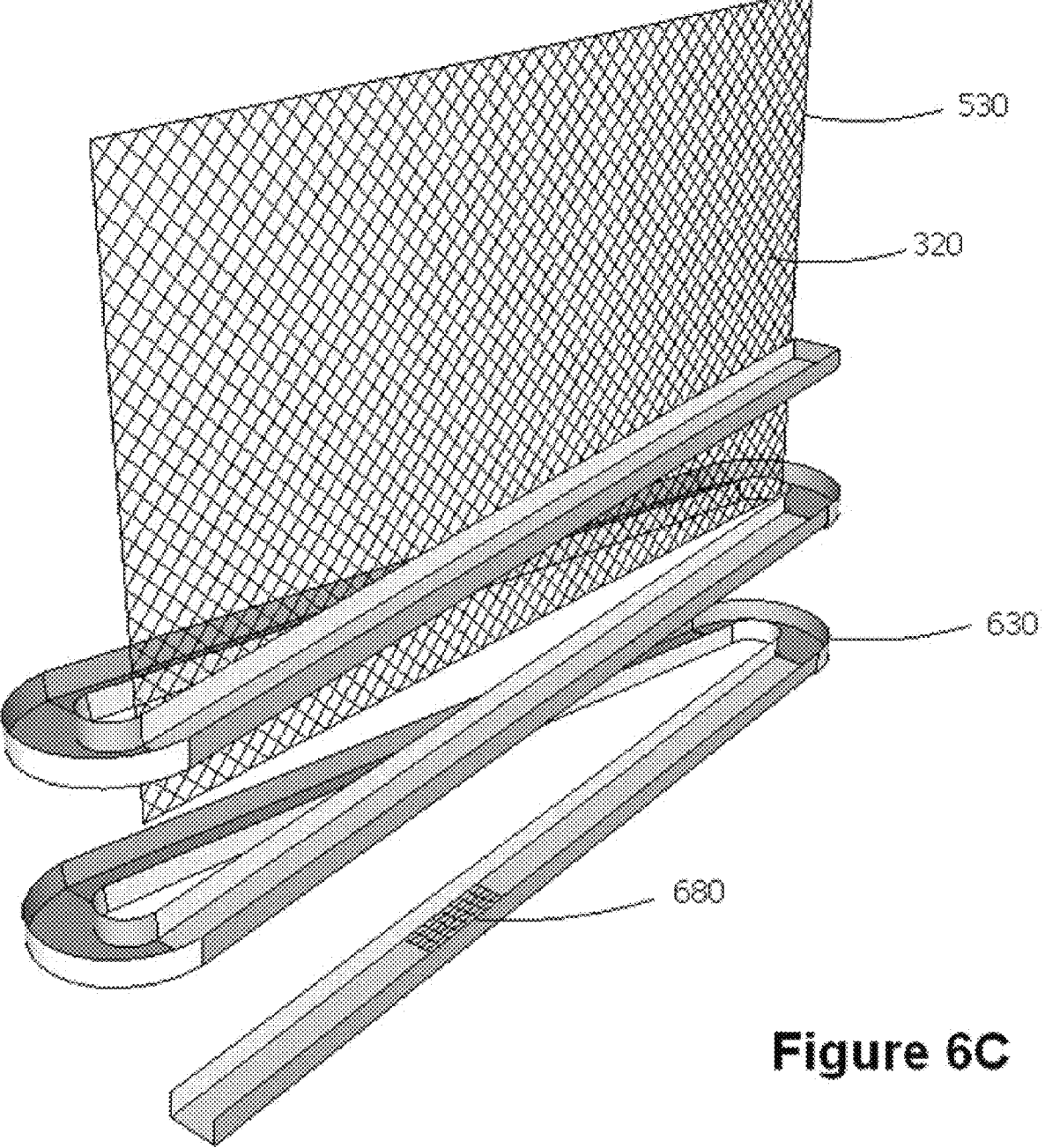
FIG. 6C shows an upper perspective view of another embodiment of a lateral flow guide on a waterfall scrubber.

FIG. 6C shows an embodiment with first lateral flow guide 630 encircling macroalgal attachment structure 530. As in FIG. 6A, if infinite vertical plane 650 were drawn here intersecting surface 320 and extending away from surface 320 in any direction, lateral flow guide 630 would intersect plane 650 at least two times, and obviously in FIG. 6C it would actually occur many more times. Also shown is second macroalgal attachment surface 680 attached to first lateral flow guide 630, to help algae attach and grow on the guide itself. The material of this second surface 680 can be similar to or different from first macroalgal attachment surface 320, and it can be on all or part of the length of guide 630.

Figure 6D:
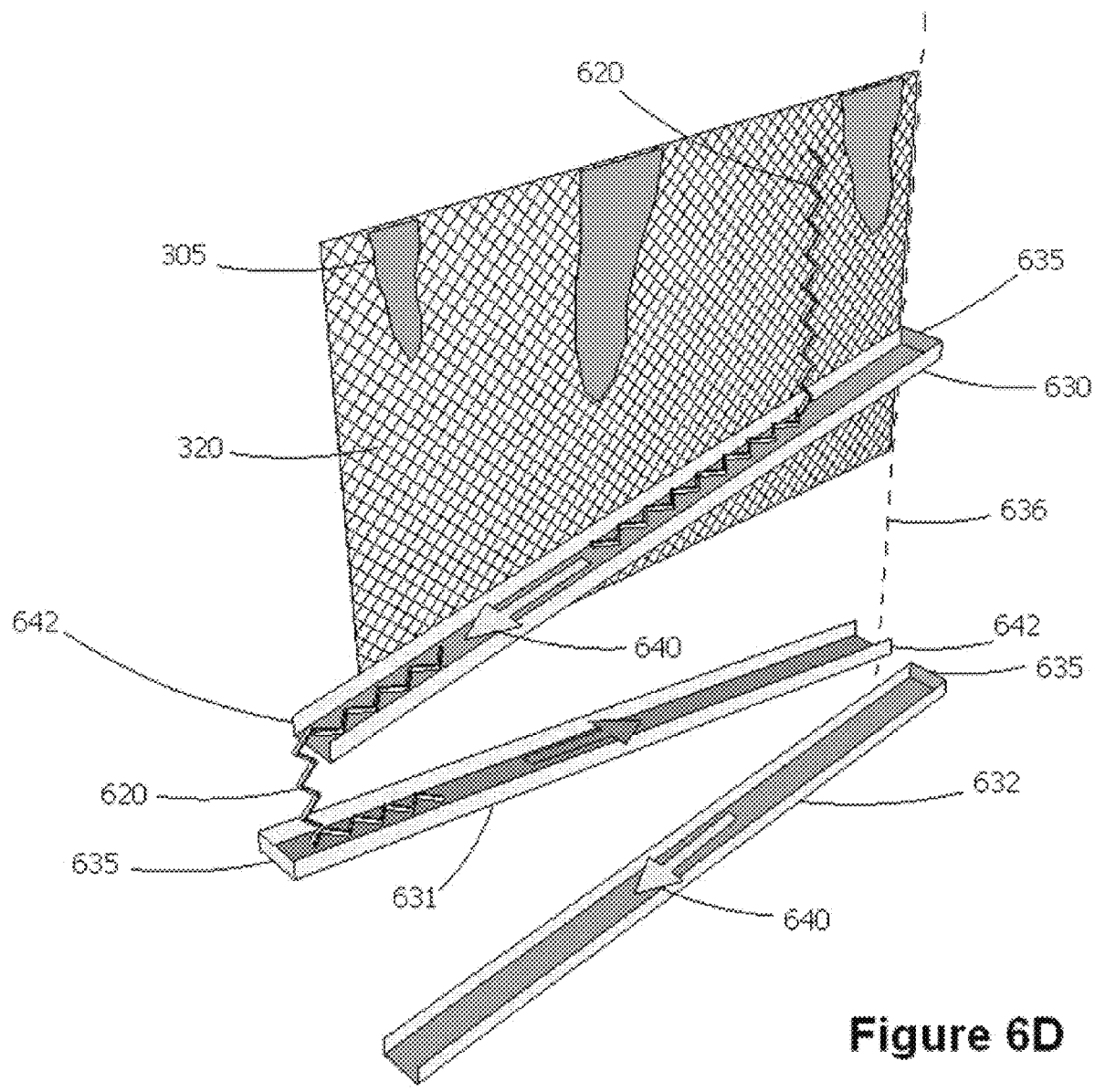
FIG. 6D shows an upper perspective view of another embodiment of a lateral flow guide on a waterfall scrubber.

FIG. 6D shows an embodiment where pathway 640 travels away from an imaginary vertical line 636 and then back towards line 636. This is because this type of embodiment does not curve from side to side, but instead drops below itself and comes back. When lengthy macroalgae 620 travels downwards with water 305 to first lateral flow guide 630, the algae and water are guided left (in this figure) along pathway 640. Pathway 640 begins at origin 635 of guide 630, and extends away from imaginary vertical line 636 leftwards at a downwards slope along macroalgal attachment surface 320 and continues beyond surface 320 to endpoint 642; although endpoint 642 is shown not to be on attachment surface 320, it could be. Lengthy macroalgae 620 and water 305 then fall off endpoint 642 and travel down to origin 635 of second lateral flow guide 631 where algae 620 and water 305 continue on towards the right (in this figure) and sloped downwards to endpoint 642. The definition herein only requires a first lateral flow guide 630 and a second lateral flow guide 631, however a third lateral flow guide 632 is additionally shown for clarity, where pathway 640 continues.

Figures 6E, 6F:
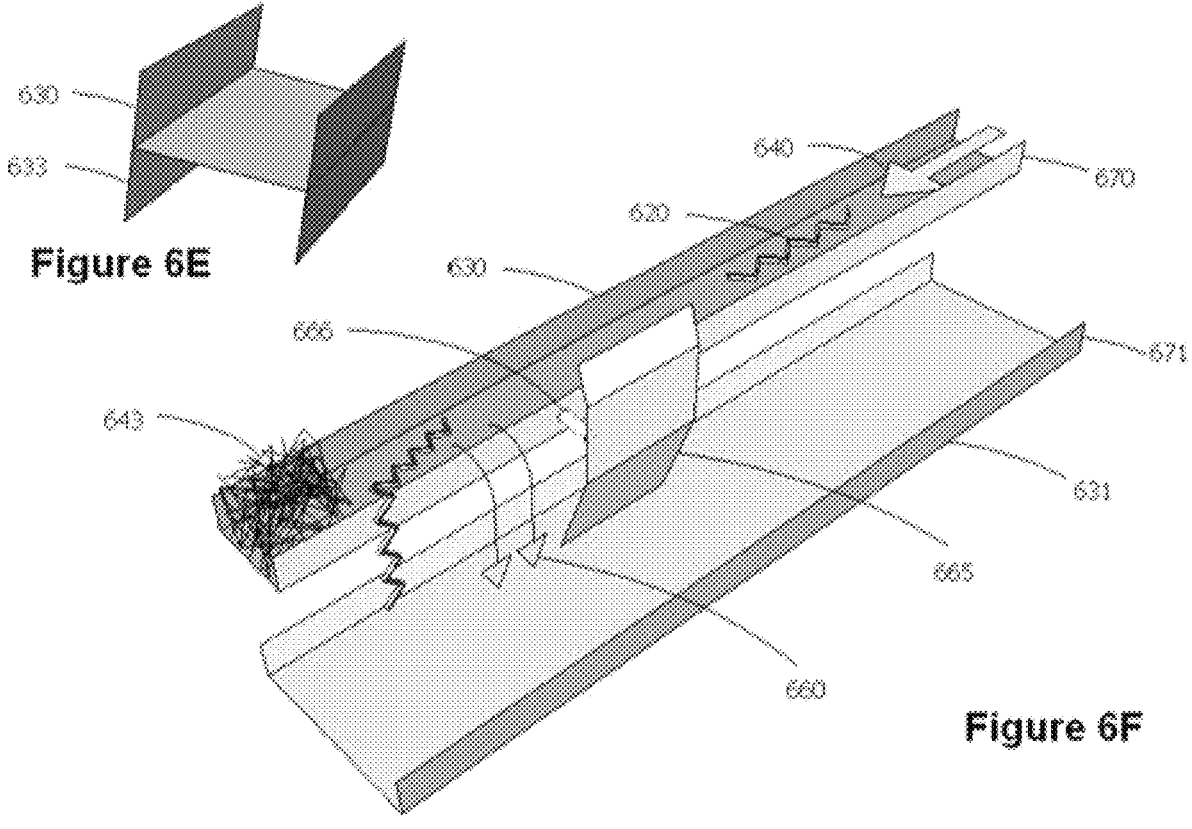
FIG. 6E shows an upper perspective view of an embodiment of a combination lateral flow guide for an upflow and waterfall scrubber.
FIG. 6F shows an upper perspective view of an embodiment of a lateral flow guide with overflow re-routing.

FIG. 6E shows an embodiment that enables both waterfall and upflow operations to occur simultaneously (attachment structure, and attachment surface, are not shown). Although waterfall embodiments in FIGS. 6A, 6C and 6D above can all be inverted and utilized with upflowing gas bubbles, FIG. 6E shows first lateral flow guide 630 on top, and inverted lateral flow guide 633 on bottom. This simple alteration enables first lateral flow guide 630 to receive downflowing algae and water when the apparatus is above a water surface, and also to receive upflowing gas bubbles when the apparatus is below a water surface, thus enabling simultaneous operation with downflowing water and upflowing gas bubbles at different portions on the pathway of a lateral flow guide. This top and bottom configuration in FIG. 6E can be used with any of the embodiments of FIGS. 6A-6D, such that when the internal water surface level (such as 510 in FIG. 5) goes lower on pathway 640 (e.g., as evaporation occurs), the section of pathway 640 that intersects the internal water surface level will change from upflow to waterfall operation. Lastly, a third macroalgal attachment surface (not visible) can be disposed on inverted guide 633, to help algae attach and grow on the guide itself.

FIG. 6F shows an embodiment that handles macroalgal blockage in either a waterfall or upflow configuration (attachment structure, and attachment surface, are not shown). This is a good example of the key difference between micro algae, and macro algae, because micro algae (green water) does not attach to solid surfaces in significant amounts, and does not grow into clumps which attach to flow guides as shown in FIG. 6F. Macro algal clumps 643 however can and do occur, and can cause flooding of waterfall style scrubbers because the water escapes off of the pathway 640 and sometimes lands on the floor. And although bubble upflow style scrubbers cannot overflow (because they are already submerged), a macroalgal clump can still divert gas bubbles away from pathway 640 and thus cause loss of growth and filtering. Taller walls 670 of the lateral flow guide would help prevent spillage, similar to the edges of a river being higher, but this would block more illumination from reaching the macroalgal attachment surface (not shown), thus limiting growth.

This embodiment in FIG. 6F has two methods of capturing water and algae that have "escaped" over the wall 670 or edge of the lateral flow guide. The first method uses a series of lateral flow guides above one another, in which a lower guide extends outwards farther than the guide above it, such that water and algae which overflow the upper guide is captured by the lower guide. First lateral flow guide 630 is shown here as an "upper" guide, and second lateral flow guide 631 is a "lower" guide, as might occur in the embodiment shown in FIG. 6D but could also be the "circular"

embodiment of FIG. 6C where there is only a first lateral flow guide 630 yet still has one section of itself above another section. Water (not shown) and lengthy macroalgae 620 are attempting to flow from right to left on first lateral flow guide 630 along pathway 640, but macroalgal clump 643 blocks the flow and causes water and algae 620 to escape wall 670 of guide 630 following arrows 660, where the water and algae fall downward to guide 631. Since wall 671 of guide 631 extends outwards farther than the wall 670, water and algae are captured by guide 631 instead of falling into the sump or onto the floor. If inverted, this same embodiment operates in gas bubble upflow configurations: gas bubbles which escape one guide will be captured by the next wider guide above it.

The second method of overflow capture is to attach an overflow re-router 665 to guide 630. Overflow re-router 665 is any shaped apparatus that can receive water (not shown) and algae 620 that has escaped sidewall 670 of first lateral flow guide 630 (following arrows 660), and subsequently guide the water and algae 620 into second lateral flow guide 631 below it, thus bypassing algal clump 643. FIG. 6F shows overflow re-router 665 to be a simple curved shape, attached by rod 666 such that re-router 665 has an open passage space between it and guide 630; this open passage space enables water and algae 620 to slide down to lower guide 631 even if lower guide 631 is not wider than upper guide 630. In particular in FIG. 6F is that overflow re-router 665 is shown to be less than the full length of upper guide 630. This is to emphasize that water and algae 620 can be captured by one method, or another method, or both methods simultaneously. If water and algae 620 overflow into re-router 665, then they will be captured by both re-router 665 and wider lower guide 631. However if water and algae 620 overflow before or after re-router 665, they will only be captured by lower guide 631. Lastly if upper guide 630 and lower guide 631 are the same size and do not extend outwards from one another, then only the water and algae which overflow into re-router 665 will be redirected into lower guide 631. And again, if inverted, this embodiment operates equally well with upflowing gas bubbles, capturing escaped bubbles from one guide by making the next guide extend out further, or by utilizing a re-router, or both.

Topic 3 Example Claims—Guidance Structures for Lengthy Macroalgae

1. Apparatus for growing and guiding lengthy macroalgae, comprising:
   a macroalgal attachment structure defining a first macroalgal attachment surface configured to hold solid macroalgal roots and to allow liquids to flow;
   a first lateral flow guide disposed on the first macroalgal attachment surface and defining an origin and also defining a pathway which intersects a vertical plane at least two times, the vertical plane passing through the macroalgal attachment surface;
   whereas lengthy macroalgae which has traveled from the first macroalgal attachment surface is guided laterally by the first lateral flow guide so as to be able to grow longer before traveling out of the apparatus.
2. The apparatus for growing and guiding lengthy macroalgae of claim 1, wherein the first lateral flow guide is positioned to receive macroalgae which has traveled from the first macroalgal attachment surface.

3. The apparatus for growing and guiding lengthy macroalgae of claim 1, further comprising a second macroalgal attachment surface disposed on the first lateral flow guide.
4. The apparatus for growing and guiding lengthy macroalgae of claim 3, wherein the second macroalgal attachment surface extends the entire pathway of the first lateral flow guide.
5. The apparatus for growing and guiding lengthy macroalgae of claim 3, further comprising a third macroalgal attachment surface disposed on an opposite side of the first lateral flow guide;
   wherein the apparatus can guide lengthy macroalgae in a waterfall configuration or a gas bubble upflow configuration.
6. The apparatus for growing and guiding lengthy macroalgae of claim 1, wherein a wall of the first lateral flow guide defines an overflow re-router;
   wherein macroalgae which has escaped the pathway of the first lateral flow guide will be redirected back to the pathway of the first lateral flow guide.
7. The apparatus for growing and guiding lengthy macroalgae of claim 1, wherein a section of the first lateral flow guide pathway farther from the origin is positioned to receive macroalgae vertically from a section of the first lateral flow guide pathway nearer to the origin;
   wherein macroalgae which has escaped the pathway of the first lateral flow guide will subsequently be guided back to the first lateral flow guide.
8. The apparatus for growing and guiding lengthy macroalgae of claim 1, wherein the pathway encircles the first macroalgal attachment structure.
9. The apparatus for growing and guiding lengthy macroalgae of claim 1, wherein the apparatus is for waterfall operation.
10. The apparatus for growing and guiding lengthy macroalgae of claim 1, wherein the apparatus is for gas bubble upflow operation.
11. Apparatus for growing and guiding lengthy macroalgae, comprising:
    a macroalgal attachment structure defining a first macroalgal attachment surface configured to hold solid macroalgal roots and to allow liquids to flow;
    a first lateral flow guide disposed on the first macroalgal attachment surface and defining an origin, endpoint, and pathway, the origin positioned on a vertical line, the pathway traveling away from the vertical line;
    a second lateral flow guide disposed on the first macroalgal attachment surface and defining an origin, endpoint, and pathway; and positioned such that macroalgae can travel from the endpoint of the first lateral flow guide to the origin of the second lateral flow guide, the pathway of the second lateral flow guide traveling towards the vertical line;
    whereas lengthy macroalgae which has grown on and traveled from the first macroalgal attachment surface is guided laterally by the first and second lateral flow guides so as to be able to grow longer before traveling out of the apparatus.
12. The apparatus for growing and guiding lengthy macroalgae of claim 11, further comprising a second macroalgal attachment surface disposed on the first lateral flow guide.
13. The apparatus for growing and guiding lengthy macroalgae of claim 12, further comprising a third macroalgal attachment surface disposed on an opposite side of the first lateral flow guide;

wherein the apparatus can guide lengthy macroalgae in a waterfall configuration or a gas bubble upflow configuration.

14. The apparatus for growing and guiding lengthy macroalgae of claim 11, wherein a wall of the first lateral flow guide defines an overflow re-router;

wherein macroalgae which has escaped the pathway of the first lateral flow guide will be redirected to the pathway of the second lateral flow guide.

15. The apparatus for growing and guiding lengthy macroalgae of claim 11, wherein a section of the second lateral flow guide is positioned to receive macroalgae vertically which has escaped the pathway of the first lateral flow guide.

16. The apparatus for growing and guiding lengthy macroalgae of claim 11, wherein the apparatus is for waterfall operation.

17. The apparatus for growing and guiding lengthy macroalgae of claim 11, wherein the apparatus is for gas bubble upflow operation.

Topic 4—Illumination Control Using Attachment Structures

Applicant's previous art waterfall 300 and upflow 400 configurations all utilized flat screens for algal attachment because flat screens are easy to obtain. However, these screens have difficulty growing because there can be too much illumination directed at the bright white screen, thus the initial algal growth can be inhibited ("photoinhibition") until some growth starts finally covering the white screen which will then reduce the brightness. Once thick growth occurs, more illumination is then needed to penetrate this growth. Applicant's first attempt at controlling this illumination was an automatic lighting controller (PCT/US/2012/051040, incorporated by reference) which used optical sensors to determine the amount and type of growth on the screen, and then varied the amount of illumination accordingly. This technique did work but optical sensors tend to get dirty, especially in saltwater, and the system as a whole was complex and thus not practical for small installations as might go into the back compartment of desktop "all in one" aquariums.

Figure 7:
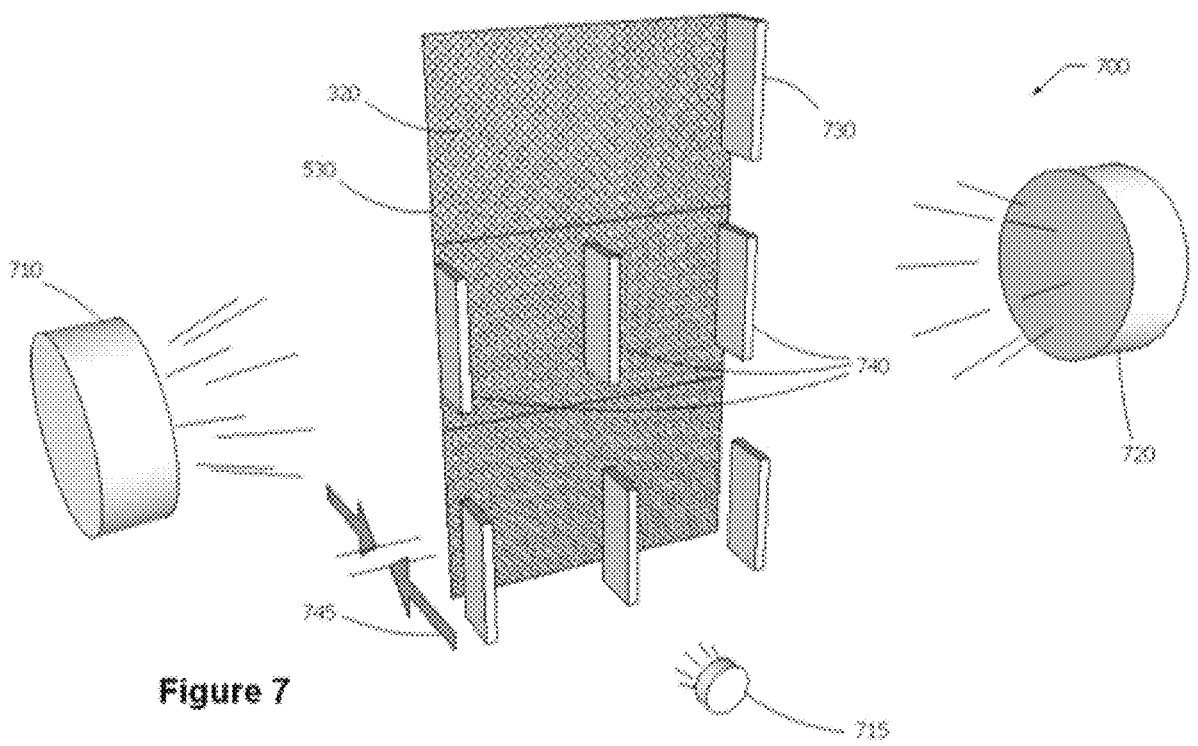
FIG. 7 shows an upper perspective view of an embodiment of a non-symmetrical macroalgal attachment structure for illumination control.

FIG. 7 shows apparatus 700 with several embodiments of non-symmetrical macroalgal attachment structures for illumination control. Macroalgal attachment structure 530 has point-source illumination 710 (shown enlarged) on the left side, projecting illumination towards the right, and point-source illumination 720 on the right side, projecting illumination towards the left. These two separate sources of illumination are shown for clarity, however this embodiment is best utilized with only one source, where you rotate apparatus 700 instead.

Perpendicular illumination blocker 730 is shown disposed on the right side of macroalgal attachment structure 530, and is a vertical structure allowing downflowing water or upflowing gas bubbles (not shown) to flow easily. Illumination from point-source 710 travels easily to macroalgal attachment surface 320, as would be needed if attached macroalgal growth were established on surface 320. However when surface 320 is new (especially if white), point-source illumination 710 can be too much illumination. Illumination from the other point-source 720 however is reduced by perpendicular illumination blocker 730 before the illumination travels to attachment surface 320, thus enabling initial algal attachment without photoinhibition (which is when algae cannot grow because the illumination is too strong). In practice, only one point-source illumination is needed for this embodiment, and apparatus 700 is rotated by the user so that perpendicular illumination blocker 730 is either on the left or right side. This solves the problem of using optical sensors, electronics, and other items that are not desired near marine conditions; only a mechanical change of position is needed, which the user is probably doing anyway during weekly aquarium maintenance. And being non-symmetrical, screen 530 with blocker 730 will reduce illumination in a non-uniform pattern on surface 320 (brighter on one side, and less bright on another side), and this will inform the user if more or less illumination is needed because one side will grow more than the other. This feedback is not available on a standard symmetrical flat screen 530 shown in earlier figures because the illumination is the same across the growth area.

While blocker 730 works well when point-source illumination 710 is on the end of macroalgal attachment surface 320, it does not work as well when the point-source is nearer to the middle of macroalgal attachment surface 320, such as where point-source 715 is shown. This may occur when it is difficult to rotate apparatus 700 in a complete half circle (180 degrees) due to lack of space, or because of connected hoses or tubings, etc. To solve this (again without using electronics) the perpendicular illumination blocker 730 simply needs to be multiplied into a set of blockers 740; this requires more material and cost, but as can be seen with illumination from point-source 715, the amount of rotation of apparatus 700 needed to make shadows is less, e.g., the more individual blockers included in the set 740, the less rotation needed for apparatus 700 in order to cause shadows. Lastly, if growth is anticipated to get thick enough to clog the set of blockers 740, then a gap (shown by arrows 745) could be added between blockers 740 and attachment surface 320.

To help define the reduction of illumination achieved by rotating non-symmetrical structure 700, the amount of LUX illumination can be measured with a standard LUX meter. When placing the sensor of the LUX meter at the center of the desired growth area on surface 320, the amount of LUX should be 100 percent when apparatus 700 is in a first position; when apparatus 700 is then rotated to a second position, the measured LUX should be reduced by a desired amount, such as 50 percent. Other amount of LUX reduction could be 60, 70, 80, 90, 95 or 99 percent.

Topic 4 Example Claims—Illumination Control Using Attachment Structures

1. Non-symmetrical macroalgal attachment structure for variable growing conditions, comprising:

a macroalgal attachment structure defining a macroalgal attachment surface configured to hold solid macroalgal roots and to allow liquids to flow, the macroalgal attachment structure movable from a first position to a second position;

an illumination blocker disposed on the macroalgal attachment surface;

wherein the illumination blocker allows more point-source illumination to travel to the macroalgal attachment surface when the macroalgal attachment structure is in the first position than the second position.

2. The non-symmetrical macroalgal attachment structure of claim 1, wherein the illumination blocker is disposed on one side of the macroalgal attachment surface.

3. The non-symmetrical macroalgal attachment structure of claim 1, wherein the quantity of illumination LUX that travels to the macroalgal attachment surface is reduced at least 50 percent when the macroalgal attachment structure is in the second position than when in the first position.

4. The non-symmetrical macroalgal attachment structure of claim 1, wherein the illumination blocker extends outwards approximately perpendicular from the macroalgal attachment surface.

5. The non-symmetrical macroalgal attachment structure of claim 4, wherein the illumination blocker defines a set of mini-blockers.

6. The non-symmetrical macroalgal attachment structure of claim 5, wherein there is a gap between the illumination blocker and the macroalgal attachment surface.

7. The non-symmetrical macroalgal attachment structure of claim 1, wherein the apparatus is for a waterfall configuration.

8. The non-symmetrical macroalgal attachment structure of claim 1, wherein the apparatus is for a gas bubble upflow configuration.

9. The non-symmetrical macroalgal attachment structure of claim 1, further comprising a point source of illumination.

Topic 5—Interchangable Attachment Structures

Figure 8:
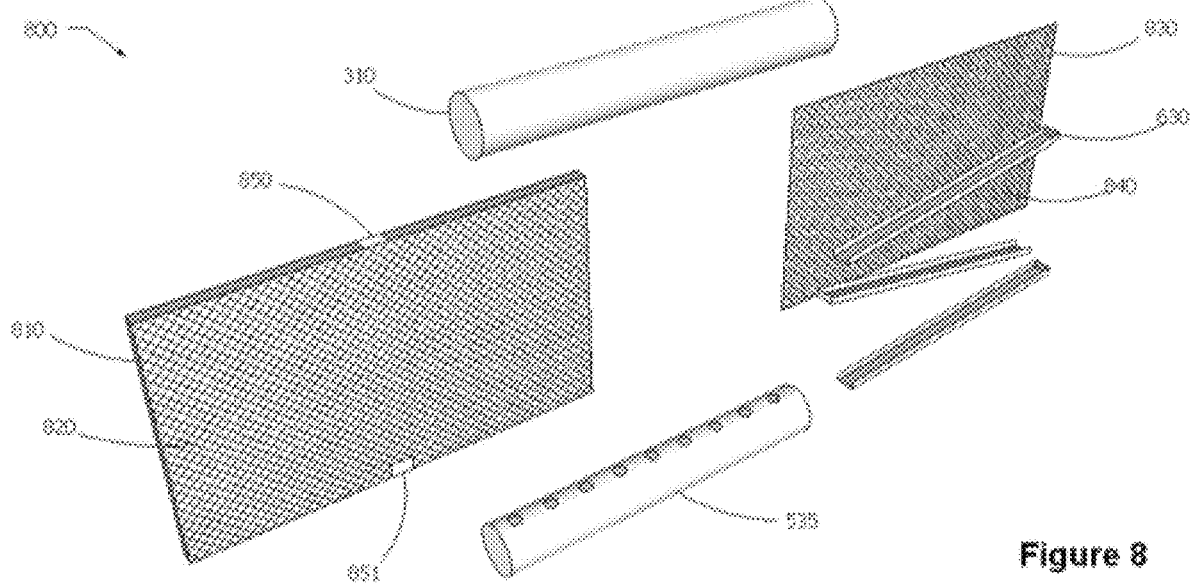
FIG. 8 shows an upper perspective view of an embodiment of an interchangeable macroalgal attachment structure.

FIG. 8 shows embodiment 800 that is a system to operate in different types of water, especially freshwater and saltwater. Since freshwater scrubbers grow mostly long stringy algae such as Spirogyra, and saltwater scrubbers grow more thick bushy algae such as Ulva Fasciata (which looks like Easter basket filler), different types of macroalgal attachment structures and surfaces are helpful in enabling the most growth in different environments. Specific attachment surfaces for different types of water have not been disclosed prior to this application, thus a system is needed to utilize different surfaces.

Macroalgal attachment structure 810 defines macroalgal attachment surface 820, and is shown adjacent to gas/water mixture delivery structure 310 which here is a water pipe (with a slot on its lower side for water to exit) to be used above a water surface, and/or a gas bubble sparger 535 to be used below a water surface, and/or some other gas/water mixture delivery structures such as a horizontal river. This particular attachment surface 820 is more suited to saltwater growth (not shown) which usually is thick and bushy, because water can still flow downwards over the thick growth. Alternate macroalgal attachment structure 830 defines macroalgal attachment surface 840 but also includes lateral flow guide 630 which is disposed on surface 840. This particular attachment surface 840 with lateral flow guide 630 is more suited to freshwater growth which is usually very long and stringy and thus needs "bending" so the growth does not flow out of the bottom of the structure. And since freshwater growth is usually not thick or bushy, it will not clog lateral flow guide 630. The user positions structure 810 or 830 into position below waterfall pipe 310 or above sparger 535, using any releasable positioning mechanism. Macroalgal attachment structures 810 and 830, and others not shown, thus enable the system to handle attached algal growth in the best manner based on the type of growth expected.

A last type of macroalgal attachment structure 810 which has not been discussed is one which disposes a passage (with upper port 850 and lower port 851) inside macroalgal attachment structure 810 such that no tube or pipe is required external to macroalgal attachment structure 810. For gas bubble operation, upper port 850 is connected to a source of gas which routes the gas through an internal passage (not visible) within macroalgal attachment structure 810 to lower port 851, where the gas then bubbles upwards. For waterfall operation, lower port 851 is connected to a source of water which routes the water through the internal passage to upper port 850 where the water then flows down macroalgal attachment structure 810.

Topic 5 Example Claims—Interchangable Attachment Structures

1. System for maximizing algae scrubber macroalgal attachment in freshwater and saltwater, comprising:
   a first macroalgal attachment structure defining a first macroalgal attachment surface configured to hold solid macroalgal roots and to allow liquids to flow;
   a second macroalgal attachment structure defining a second macroalgal attachment surface configured to hold solid macroalgal roots and to allow liquids to flow;
   a gas/water mixture delivery structure;
   a positioning mechanism configured to removably position the first or second macroalgal attachment structure such that its macroalgal attachment surface receives a gas/water mixture from the gas/water mixture delivery structure;
   wherein the first macroalgal attachment structure can be interchanged with the second macroalgal attachment structure.

2. The macroalgal attachment system of claim 1, wherein the gas/water mixture delivery structure defines a water pipe.

3. The macroalgal attachment system of claim 1, wherein the system defines a horizontal river configuration.

4. The macroalgal attachment system of claim 1, wherein the gas/water mixture delivery structure defines a gas bubble sparger.

5. The macroalgal attachment system of claim 4, wherein the gas bubble sparger defines a gas passage inside the first macroalgal attachment structure.

6. The macroalgal attachment system of claim 1, wherein the gas/water mixture delivery structure defines a water passage inside the first macroalgal attachment structure and a water outlet at an upper section of the first macroalgal attachment structure.

7. The macroalgal attachment system of claim 1, wherein the macroalgal attachment structures are substantially rigid.

8. The macroalgal attachment system of claim 1, wherein one of the macroalgal attachment structures includes at least one chaetomorpha retainer extending laterally from the macroalgal attachment surface.

9. The macroalgal attachment system of claim 1, wherein one of the macroalgal attachment structures includes a lateral flow guide;
   wherein lengthy macroalgae can be folded to keep the macroalgae inside the apparatus.

Topic 6—Settlement Structures for Continued Growth

Growth that occurs on a waterfall scrubber can eventually gets thick and heavy enough to travel (or detach) downwards from the screen, such that the growth forms a pile of substantial height on the bottom of the apparatus. If not cleaned/harvested by the user soon enough, this growth starts dying due to lack of nutrients and illumination which cannot penetrate the deep growth, or, the growth washes away and clogs a drain or water pump. This then simply puts nutrients back into the water and defeats the purpose of the waterfall scrubber.

Figure 9:
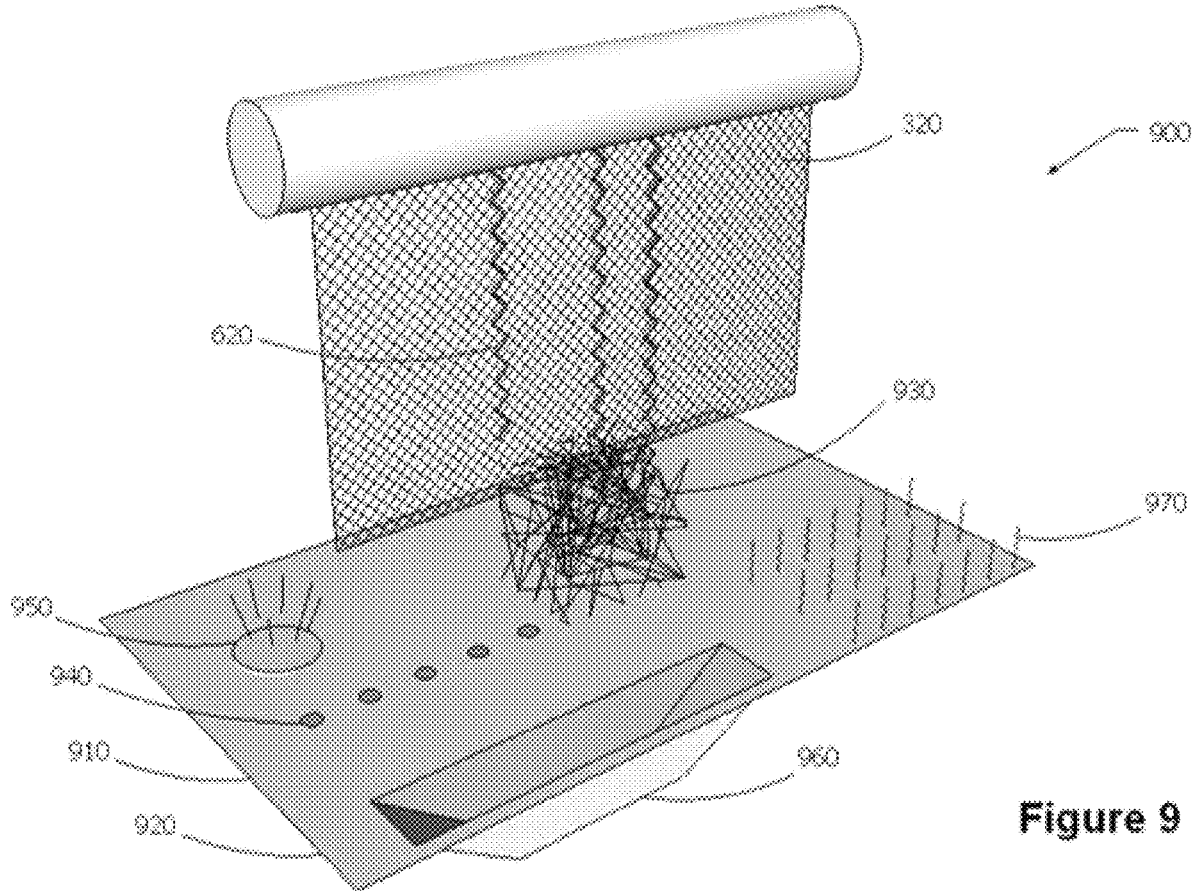
FIG. 9 shows an upper perspective view of an embodiment of a macroalgal settlement structure with growth enhancing features.

FIG. 9 shows embodiment 900 to solve this. Macroalgal settlement structure 910 defines macroalgal settlement surface 920 below macroalgal attachment surface 320. Lengthy macroalgae 620 that traveled from macroalgal attachment surface 320 to macroalgal settlement surface 920 forms a pile of macroalgae 930. Gas sparger outlets 940 are disposed on surface 920. Although gas spargers are normally submerged below a water surface so as to produce gas bubbles (shown earlier as label 410) which rise upwards through water, if you place sparger outlets 940 on the upper side of settlement surface 920 as shown, gas will still produce gas bubbles inside of macroalgal pile 930 because pile 930 is wet. This provides several benefits:

First is nutrient flow. Since gas bubbles (not visible) rise upwards inside pile 930 and provide gas/water turbulence as described earlier, $CO_2$ from the ambient air enters the water, which then is absorbed along with other nutrients into algae 930. Secondly, the gas bubbles physically help to prevent pile 930 from compacting into a tighter mass (such as a compost pile). And lastly, as the gas bubbles move through and emerge at the top of pile 930, the bubbles open brief pathways for illumination from above to travel downwards through pile 930, thereby sustaining photosynthesis in pile 930. To additionally help sustain photosynthesis are illumination sources 950 disposed on settlement surface 920, which project illumination mostly upwards through algal pile 930 when pile 930 is on top of source 950. Because illumination in prior art waterfall scrubbers (FIG. 3) would be from above pile 930, the sources 950 help to illuminate the bottom portions of pile 930. And if gas bubbles are also supplied by sparger outlets 940, then algal pile 930 will again have small internal pathways created for illumination from sources 950 to travel through pile 930.

Because pile 930 can accumulate to a greater height when sparger outlets 940 and illumination sources 950 are added, the pile thickness can be made even greater by adding valley 960. Valley 960 then acts like a storage area for algae, and continued growth of algae can occur in valley 960 when a sparger and illumination source are added to the bottom of valley 960. Pile 930 height can also be increased if macroalgal gripping structures 970 are attached to surface 920, preventing algae 930 from falling off of macroalgal settlement surface 920. Gripping structures 970 can be flexible or rigid.

Figure 10:
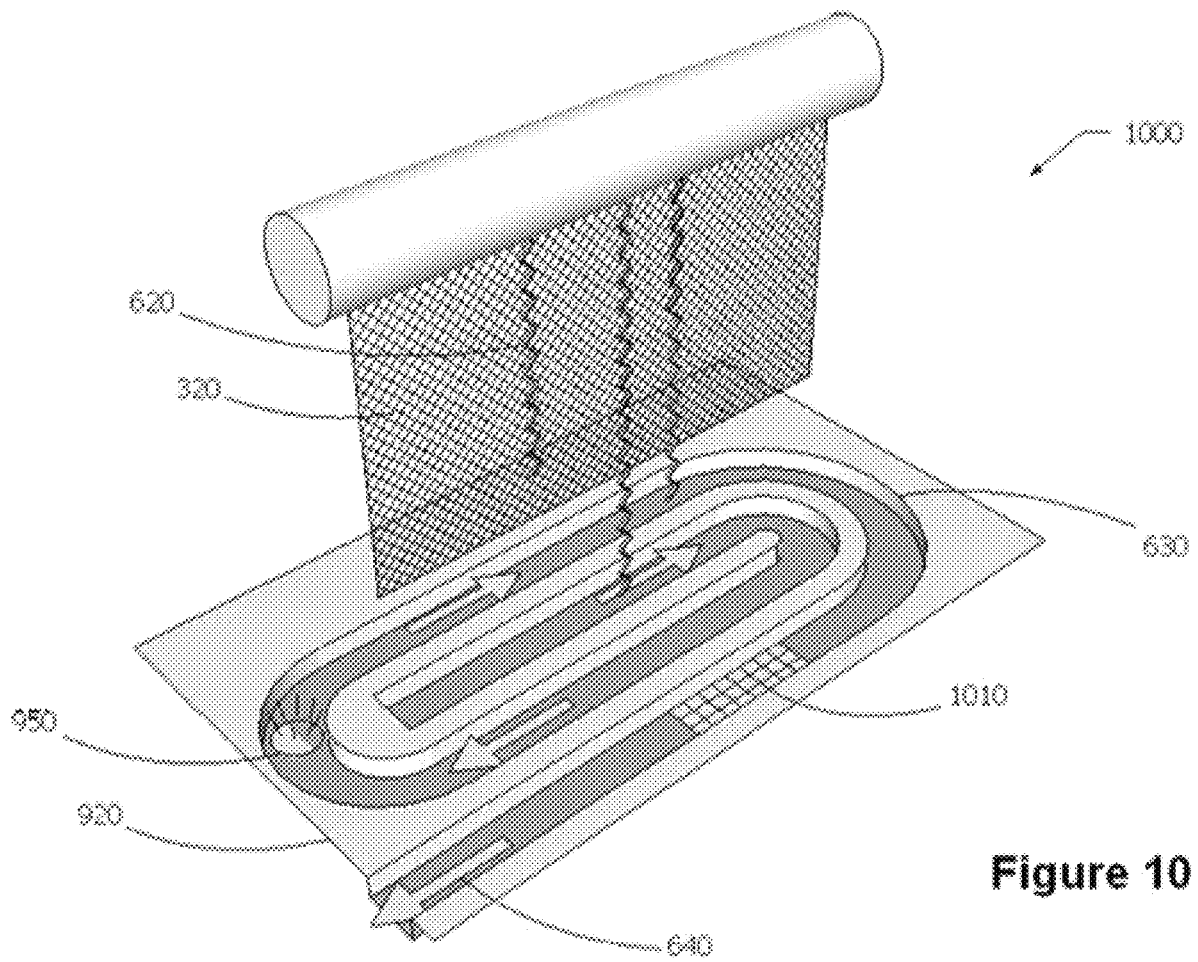
FIG. 10 shows an upper perspective view of another embodiment of a macroalgal settlement structure with growth enhancing features.

FIG. 10 shows embodiment 1000 which utilizes lateral flow guide 630 disposed on macroalgal settlement surface 920. The difficulty of handling settled macroalgae is greater when the algae is lengthy such as 620. In this case the algae not only can pile up on surface 920 but also can grow over one meter in length as with Spirogyra species in freshwater. Therefore installing lateral flow guide 630 onto surface 920 helps solve this by channeling lengthy growth 620 laterally along pathway 640 to prevent the growth from overflowing out of the apparatus. A pathway 640 shaped like a spiral, as shown, is especially useful because it enables lengthy growth 620 to flow outwards away from the center of settlement surface 920, so that less thickness will develop in the center of surface 920 beneath attachment surface 320, thereby helping to prevent illumination blockage into the algae. Illumination sources 950 can be disposed in guide 630, and lastly, another macroalgal attachment structure 1010 can also be disposed in the pathway of flow guide 630 so as to enable algae 620 to attach and grow longer without washing away. If attachment structure 1010 covers illumination source 950, then structure 1010 can be made of a translucent or transparent material to allow illumination to travel through it. Gas sparger outlets could also be added into guide 630.

Topic 6 Example Claims—Settlement Structures for Continued Growth

1. Apparatus to increase settled macroalgal growth in a waterfall algae scrubber, comprising:
   a macroalgal attachment structure defining a macroalgal attachment surface configured to hold solid macroalgal roots and to allow liquids to flow;
   a macroalgal settlement structure defining a macroalgal settlement surface disposed below the macroalgal attachment surface;
   a gas sparger defining a gas outlet disposed on the macroalgal settlement surface;
   wherein macroalgae that has traveled from the macroalgal attachment surface to the macroalgal settlement surface and has formed a macroalgal settlement height above the macroalgal settlement surface will be supplied with gas bubbles from the gas outlet, the gas bubbles traveling through the settled macroalgal growth thereby enabling the settled macroalgal growth to accumulate for a longer period of time before dying from lack of nutrients.

2. The apparatus to increase settled macroalgal growth of claim 1, wherein the macroalgal settlement surface has a valley.

3. The apparatus to increase settled macroalgal growth of claim 2, wherein a gas outlet is disposed at the bottom of the valley.

4. The apparatus to increase settled macroalgal growth of claim 1, further comprising a lateral flow guide disposed on the macroalgal settlement surface.

5. The apparatus to increase settled macroalgal growth of claim 4, wherein the lateral flow guide defines a spiral pathway around the macroalgal attachment surface.

6. The apparatus to increase settled macroalgal growth of claim 5, further comprising a second macroalgal attachment structure disposed in the pathway of the lateral flow guide.

7 Apparatus to increase settled macroalgal growth in a waterfall algae scrubber, comprising:
   a macroalgal attachment structure defining a macroalgal attachment surface configured to hold solid macroalgal roots and to allow liquids to flow;
   a macroalgal settlement structure defining a macroalgal settlement surface disposed below the macroalgal attachment surface;
   an illumination source disposed on the macroalgal settlement surface;
   wherein macroalgae that has traveled from the macroalgal attachment surface to the macroalgal settlement surface and has formed a macroalgal settlement height above the macroalgal settlement surface will be supplied with illumination from the illumination source, the illumination traveling through the settled macroalgal growth thereby enabling the settled macroalgal growth to accumulate for a longer period of time before dying from lack of illumination.

8. The apparatus to increase settled macroalgal growth of claim 7, wherein the macroalgal settlement surface has a valley.

9. The apparatus to increase settled macroalgal growth of claim 8, wherein an illumination source is disposed at the bottom of the valley.

10. The apparatus to increase settled macroalgal growth of claim 7, further comprising a lateral flow guide disposed on the macroalgal settlement surface.

11. The apparatus to increase settled macroalgal growth of claim 10, wherein the lateral flow guide defines a spiral pathway around the macroalgal attachment surface.

12. The apparatus to increase settled macroalgal growth of claim 10, wherein the lateral flow guide is translucent; thereby enabling illumination from the illumination source to travel to algae within the lateral flow guide.

13. The apparatus to increase settled macroalgal growth of claim 7, further comprising a second macroalgal attachment structure disposed in the pathway of the lateral flow guide.

14. The apparatus to increase settled macroalgal growth of claim 13, wherein the second macroalgal attachment structure is translucent.

15. Apparatus to increase settled macroalgal growth in a waterfall algae scrubber, comprising:

a macroalgal attachment structure defining a macroalgal attachment surface configured to hold solid macroalgal roots and to allow liquids to flow;

a macroalgal settlement structure defining a macroalgal settlement surface disposed below the macroalgal attachment surface;

a set of macroalgal gripping structures disposed on the macroalgal settlement surface;

wherein macroalgae that has traveled from the macroalgal attachment surface to the macroalgal settlement surface will be secured from falling off the macroalgal settlement surface by the macroalgal gripping structures thereby enabling the settled macroalgae to accumulate for a longer period of time.

16. The apparatus to increase settled macroalgal growth of claim 15, wherein the macroalgal gripping structures are flexible.

17. The apparatus to increase settled macroalgal growth of claim 15, wherein the macroalgal gripping structures are rigid.

18. The apparatus to increase settled macroalgal growth of claim 15, further comprising a lateral flow guide disposed on the macroalgal settlement surface.

19. The apparatus to increase settled macroalgal growth of claim 18, wherein the lateral flow guide defines a spiral pathway around the macroalgal attachment surface.

20. The apparatus to increase settled macroalgal growth of claim 15, further comprising a second macroalgal attachment structure disposed on the pathway of the lateral flow guide.

The invention claimed is:

1. Method of increasing photosynthetic water filtration, comprising the steps of:

growing macroalgae or plant;

supplying gas bubbles to the macroalgae or plant such that the gas bubbles are directed to travel through and rub strands or leaves of the macroalgae or plant;

harvesting a portion of the macroalgae or plant including any attached algal growths.

2. The macroalgal growing method of claim 1, wherein the step of supplying gas bubbles is done before growths have attached to the macroalgae or plant.

3. The macroalgal growing method of claim 1, wherein the step of growing macroalgae or plant is performed first.

4. The macroalgal growing method of claim 1, wherein the step of growing macroalgae or plant includes starting with a smaller amount of macroalgae or plant and then growing it into a larger amount.

5. The macroalgal growing method of claim 1, wherein the attached growth is slime macroalgae.

6. The macroalgal growing method of claim 1, wherein the attached growth is filamentous macroalgae.

7. The macroalgal growing method of claim 1, further comprising the step of supplying an initial quantity of macroalgae or plant.

8. The macroalgal growing method of claim 1, wherein the step of growing macroalgae or plant utilizes chaetomorpha macroalgae.

9. The macroalgal growing method of claim 1, wherein the gas bubbles are supplied below the macroalgae or plant; thereby enabling the gas bubbles to rise upwards through and rub the individual strands or leaves of the macroalgae or plant.

10. The macroalgal growing method of claim 1, wherein the gas bubbles are supplied inside the macroalgae or plant; thereby enabling the gas bubbles to rise upward through and rub an upper portion of the individual strands or leaves of the macroalgae or plant, thereby enabling a lower portion to be free of attached algal growths and thus ready for another growth cycle.

11. The macroalgal growing method of claim 1, further comprising the step of supplying a gas bubble sparger.

12. The macroalgal growing method of claim 11, wherein the gas bubble sparger is disposed below the macroalgae or plant; thereby enabling the gas bubbles to rise upwards through and rub the individual strands or leaves of the macroalgae or plant.

13. The macroalgal growing method of claim 11, wherein the gas bubble sparger is disposed inside the macroalgae or plant; thereby enabling the gas bubbles to rise upward through and rub an upper portion of the individual strands or leaves of the macroalgae or plant, thereby enabling a lower portion to be free of attached algal growths and thus ready for another growth cycle.

14. The macroalgal growing method of claim 11, wherein the gas bubble sparger is movable; thereby enabling an unobstructed pathway for the macroalgae or plant to be harvested.

15. The macroalgal growing method of claim 1, further comprising the step of supplying a containment structure defining a containment compartment; wherein the macroalgae or plant is contained within the containment compartment and the gas bubbles rise upwards through the containment compartment.

16. The macroalgal growing method of claim 15, further comprising the step of supplying a gas bubble sparger.

17. The macroalgal growing method of claim 16, wherein the gas bubble sparger is disposed at a bottom of the containment compartment; thereby enabling the gas bubbles to rise upward through and rub the individual strands or leaves of the macroalgae or plant.

18. The macroalgal growing method of claim 16, wherein the gas bubble sparger is disposed in a center of the containment compartment; thereby enabling the gas bubbles to rise upward through and rub an upper portion of the individual strands or leaves of the macroalgae or plant, thereby enabling a lower portion to be free of attached algal growths and thus ready for another growth cycle.

19. The macroalgal growing method of claim 16, wherein the gas bubble sparger is retractable into a wall of the macroalgal containment structure;

thereby enabling an unobstructed pathway for the macroalgae or plant to be harvested.

\* \* \* \* \*